US007665657B2

(12) United States Patent
Huh

(10) Patent No.: US 7,665,657 B2
(45) Date of Patent: Feb. 23, 2010

(54) BANK TRANSACTION METHOD LINKING ACCOUNTS VIA COMMON ACCOUNTS

(76) Inventor: Inghoo Huh, 3-113, Bukgajwa-Dong, Seodaemun-Gu, Seoul 120-810 (KR)

( * ) Notice: Subject to any disclaimer, the term of this patent is extended or adjusted under 35 U.S.C. 154(b) by 642 days.

(21) Appl. No.: 10/595,575

(22) PCT Filed: Dec. 10, 2004

(86) PCT No.: PCT/KR2004/003252

§ 371 (c)(1),
(2), (4) Date: Apr. 27, 2006

(87) PCT Pub. No.: WO2005/059795

PCT Pub. Date: Jun. 30, 2005

(65) Prior Publication Data

US 2007/0130062 A1 Jun. 7, 2007

(30) Foreign Application Priority Data

Dec. 18, 2003 (KR) .................... 10-2003-0092845

(51) Int. Cl.
- G06Q 40/00 (2006.01)
- G07D 11/00 (2006.01)
- G07F 19/00 (2006.01)
- G06K 5/00 (2006.01)
- G06K 19/00 (2006.01)
- G06K 19/06 (2006.01)

(52) U.S. Cl. ................. 235/379; 235/380; 235/487; 235/492; 235/493; 705/35; 705/39

(58) Field of Classification Search ............... 235/379, 235/380; 705/35, 39

See application file for complete search history.

(56) References Cited

U.S. PATENT DOCUMENTS

| 5,649,118 A * | 7/1997 | Carlisle et al. ............... 705/41 |
| 5,914,472 A | 6/1999 | Foladare et al. |
| 5,953,710 A * | 9/1999 | Fleming ..................... 705/38 |
| 5,984,180 A * | 11/1999 | Albrecht .................... 235/380 |
| 6,189,787 B1 * | 2/2001 | Dorf ......................... 235/380 |
| 6,278,982 B1 * | 8/2001 | Korhammer et al. ...... 705/36 R |

(Continued)

FOREIGN PATENT DOCUMENTS

| KR | 1020020031531 | 5/2002 |
| KR | 1020020097303 | 12/2002 |

*Primary Examiner*—Daniel Walsh
(74) *Attorney, Agent, or Firm*—Lowe Hauptman Ham & Berner, LLP

(57) ABSTRACT

The present invention discloses a bank transaction method linking accounts via common accounts, wherein the existing accounts of the account holder and/or newly opened plural accounts link arbitrarily as defined by the account holder for convenient transactions between account holder's primary account and other's secondary accounts without using account numbers of the concerned accounts. To fulfill, the purpose, the present invention enables the account holder to make transactions on a primary account as well on linked secondary accounts in real time; and the said primary and secondary accounts are also offered for independent transaction as ordinary bank accounts. In addition, the classification and management of the said primary and secondary accounts are attainable through the individual account number with specified account code given by the bank to achieve transactions between the said primary and secondary accounts while implementing the conventional banking system. Furthermore, transaction to the external transaction network including payment gateway can be processed without changing the existing data format, both of account holders' and bank's convenience is maximized.

6 Claims, 27 Drawing Sheets

| bank(branch) ID | account type | account number | CRC | account classification code | |
|---|---|---|---|---|---|
| holder's account | 123 - 77 - 230 - XX | | | 00 | primary account number |
| account for the holder's child B | 123 - 77 - 231 - XX | | | 01 | linked secondary account number A |
| merchant specific account | 123 - 77 - 232 - XX | | | 99 | linked secondary account number B |
| merchant specific account | 123 - 77 - 233 - XX | | | 98 | linked secondary account number C |
| another holder's account | 123 - 77 - 240 - XX | | | 00 | primary account number |
| account for the another holder's household A | 123 - 77 - 241 - XX | | | 01 | linked secondary account number D |
| merchant specific account | 123 - 77 - 242 - XX | | | 98 | linked secondary account number E |
| merchant specific account | 123 - 77 - 243 - XX | | | 97 | linked secondary account number F |
| merchant specific account | 123 - 77 - 244 - XX | | | 96 | linked secondary account number G |

U.S. PATENT DOCUMENTS

| | | | |
|---|---|---|---|
| 6,415,270 B1 * | 7/2002 | Rackson et al. | 705/36 R |
| 6,418,419 B1 * | 7/2002 | Nieboer et al. | 705/37 |
| 6,422,462 B1 * | 7/2002 | Cohen | 235/381 |
| 6,796,497 B2 * | 9/2004 | Benkert et al. | 235/380 |
| 6,865,547 B1 * | 3/2005 | Brake et al. | 705/41 |
| 6,901,387 B2 * | 5/2005 | Wells et al. | 705/64 |
| 6,915,277 B1 * | 7/2005 | Manchester et al. | 705/39 |
| 6,999,943 B1 * | 2/2006 | Johnson et al. | 705/39 |
| 7,184,979 B1 * | 2/2007 | Carson | 705/35 |
| 7,406,442 B1 * | 7/2008 | Kottmeier et al. | 705/35 |
| 7,472,090 B1 * | 12/2008 | White | 705/38 |
| 7,509,289 B2 * | 3/2009 | Barron et al. | 705/44 |
| 2001/0032192 A1 * | 10/2001 | Putta et al. | 705/76 |
| 2001/0034720 A1 * | 10/2001 | Armes | 705/65 |
| 2002/0087441 A1 * | 7/2002 | Wagner et al. | 705/30 |
| 2002/0099635 A1 * | 7/2002 | Guiragosian | 705/35 |
| 2002/0147675 A1 * | 10/2002 | Das et al. | 705/37 |
| 2002/0156723 A1 * | 10/2002 | Lilly et al. | 705/38 |
| 2003/0009402 A1 * | 1/2003 | Mullen et al. | 705/35 |
| 2003/0080185 A1 * | 5/2003 | Werther | 235/380 |
| 2003/0208430 A1 * | 11/2003 | Gershon | 705/36 |
| 2004/0006497 A1 * | 1/2004 | Nestor et al. | 705/5 |
| 2004/0049452 A1 * | 3/2004 | Blagg | 705/39 |
| 2004/0111367 A1 * | 6/2004 | Gallagher et al. | 705/39 |
| 2004/0143527 A1 * | 7/2004 | Benkert et al. | 705/35 |
| 2004/0158522 A1 * | 8/2004 | Brown et al. | 705/40 |
| 2004/0181453 A1 * | 9/2004 | Ray et al. | 705/16 |
| 2005/0080730 A1 * | 4/2005 | Sorrentino | 705/39 |
| 2005/0098624 A1 * | 5/2005 | Foss, Jr. | 235/380 |
| 2005/0149437 A1 * | 7/2005 | Zellner et al. | 705/39 |
| 2005/0278187 A1 * | 12/2005 | Bobbitt | 705/1 |
| 2005/0283372 A1 * | 12/2005 | Jorgenson et al. | 705/1 |
| 2006/0036543 A1 * | 2/2006 | Blagg et al. | 705/39 |
| 2007/0119921 A1 * | 5/2007 | Hogg et al. | 235/380 |
| 2007/0130062 A1 * | 6/2007 | Huh | 705/39 |
| 2007/0175985 A1 * | 8/2007 | Barnes et al. | 235/381 |
| 2008/0169344 A1 * | 7/2008 | Huh | 235/380 |
| 2008/0228615 A1 * | 9/2008 | Scipioni et al. | 705/35 |
| 2008/0228637 A1 * | 9/2008 | Scipioni et al. | 705/39 |
| 2008/0228638 A1 * | 9/2008 | Scipioni et al. | 705/39 |
| 2009/0083181 A1 * | 3/2009 | Bishop et al. | 705/41 |
| 2009/0192904 A1 * | 7/2009 | Patterson et al. | 705/17 |

* cited by examiner

Figure 11

| | bank(branch) ID | account type | account number | CRC | account classification code | |
|---|---|---|---|---|---|---|
| holder's account | 123 | - 77 | - 230 | - XX | —— 00 | primary account number |
| account for the holder's child B | 123 | - 77 | - 231 | - XX | —— 01 | linked secondary account number A |
| merchant specific account | 123 | - 77 | - 232 | - XX | —— 99 | linked secondary account number B |
| merchant specific account | 123 | - 77 | - 233 | - XX | —— 98 | linked secondary account number C |
| another holder's account | 123 | - 77 | - 240 | - XX | —— 00 | primary account number |
| account for the another holder's household A | 123 | - 77 | - 241 | - XX | —— 01 | linked secondary account number D |
| merchant specific account | 123 | - 77 | - 242 | - XX | —— 98 | linked secondary account number E |
| merchant specific account | 123 | - 77 | - 243 | - XX | —— 97 | linked secondary account number F |
| merchant specific account | 123 | - 77 | - 244 | - XX | —— 96 | linked secondary account number G |

Figure 12

| | bank(branch) ID | account type | account number | CRC | account classification code | |
|---|---|---|---|---|---|---|
| James' account | 123 | - 77 | - 230 | - XX | —— 00 | |
| Jason's allowance | 123 | - 77 | - 231 | - XX | —— 01 | — Jason |
| Jason's tuition fee | 123 | - 77 | - 232 | - XX | —— 99 | |
| Jason's institute fee | 123 | - 77 | - 233 | - XX | —— 98 | |

Figure 13

| account classification code | |
|---|---|
| 00 | holder's account (primary) |
| 01 | holder's child's account |
| 99 | school tuition fee |
| 98 | institute fee |
| 97 | mobile communication fee |
| 96 | mass transportation fee |
| .... | |

BANK TRANSACTION METHOD LINKING ACCOUNTS VIA COMMON ACCOUNTS

TECHNICAL FIELD

Most of bank customers today have plural number of accounts at more than one bank. Therefore, as existing customers have to make transaction for each bank they have account with, customers have to bear the inconvenience of having to remember account numbers and PIN for each, furthermore, on-line transaction service is still limited to depend upon each bank's condition on working hour and services offered.

The plural accounts of a customer could be organized to be merged into one account, nonetheless, this not only is practically meaningless in reality for the customer has to classify the accounts by expenditure but is also expected to increase inconvenience in management.

BACKGROUND ART

One existing prior art in transaction using bank account is the published patent application KR2001-0107852, which describes virtual accounts to recharge debit card and electronic money, and perform banking function internally within the issuing company, which is a non-bank organization. This technique, however, has disadvantages wherein both of the account holder and bank having to remember all concerned account numbers in order to do transaction via virtual account, furthermore, the plural virtual accounts are only for incoming transactions, and the virtual accounts can not be accessed independently.

Another prior art, KR2002-0097303 is on method and system to restrict and monitor the indiscreet use of cyber account (or debit card) in an internet website by minors; it describes that from the client (master) applying for issuance of cyber account (or debit card) receives the bank account number to be transferred to and data including personal information (name and resident number) of the third clients (slaves) to use the account; with reference to the received data. When a request for verification on issuance of cyber account (or debit card) at the bank where fore-mentioned clearing account is issued, following decision on issuance, issue plural number of cyber accounts (or debit card) the client (master) has applied and allow the clients (slaves) paid by the client (master) to use within internet; transaction on payment the third clients (slaves) spent account (or debit card) is made via the cyber account (or debit card) of client (master) who applied for the account, cyber account applicant client (master) must specify the website(s) permitted to connect at the time of account (or debit card) issuance by third clients' (slaves) age (if minor). The first disadvantage of the art is that the client must remember all account numbers, and second, transactions via plural accounts are only available on internet. As all the transaction are not performed in real banking system, the technology still needs additional transaction process at bank to keep balance and impossible to be done in real time.

KR2002-0031531, describes on plural number of affiliate organization server; and the virtual accounts relay system and methods which includes plural number of bank server managing virtual accounts and the primary account which virtual accounts belong to, the plural number of affiliate organization server, and relay organization server to manage banking process that opening of accounts and transactions can not be estimated as virtual accounts are assigned per every transaction, such virtual accounts are left existing following the termination of transaction which makes management difficult with increasing invalid virtual accounts, and in effect opening of virtual accounts are limited to only between organizations and not available to individuals.

KR 2001-0000616 describes a technique on network account transfer system using main transaction account(s) and plural number of sub-accounts as well as on the method of e-commerce business. Disadvantages involved here are that this technique is mainly on creating separate accounts for transactions at shopping malls, etc., which require both the user and bank to remember all concerned accounts' number to perform the transaction via sub-accounts, furthermore, user has to bear the complexity as the transaction is via plural number of accounts. As all the transaction are not performed in real banking system, the technology also needs additional transaction process at bank to keep balance and impossible to be done in real time.

DISCLOSURE

Technical Solution

The purpose of this invention is to allow a convenient transaction with a bank transaction system for linked accounts via common accounts, to compose a bank transaction system wherein the existing account holder's primary account(s) and/or newly opened other holders' secondary plural accounts to link arbitrarily as defined by the account holders, transactions between the said primary and secondary accounts are performed without using the concerned account numbers.

Another purpose of the present invention is to allow both on-line and off-line transactions through easy linking of a primary account to existing accounts as secondary accounts and/or newly issued plural secondary accounts by the primary account holder and through integrating newly issued secondary accounts by linking to a primary account, or differentiate to individual transaction account as the primary account holder requires.

Another purpose of the invention is to allow the holder of primary account to transact the linked secondary accounts in real time when making transactions on the primary account simultaneously.

Another purpose of the invention is that the each account holder of secondary account is allowed for independent transactions on her/his account as an ordinary bank account, which is defined to be secondary account by the primary account holder.

The said primary account is subject for inquiry and transaction with corresponding account number and PIN; and at the same time the holder of the said primary account can open linked secondary account(s), wherein one among the secondary account(s) could be appointed as another holder's own account. The primary account is with serviceability in opening and making transactions on plural number of secondary accounts.

When the primary account holder is making inquiries and transactions on the primary account with corresponding account number and PIN (password), the secondary accounts are linked for inquiry and transaction at the same time, thus not only saved from the trouble of inquiry and transaction by each linked accounts, it is not required for the primary account holder to remember all account numbers of the linked account since inquiry and transaction is processed by either account number or name given by the primary account holder.

The secondary account(s) which the primary account holder has appointed, is one of the linked accounts, and the secondary account holder can be selectively restricted in inquiry and transaction on the appointed account(s) other than the specified account; the other account holder which the primary account holder has appointed can do transaction to the secondary account(s) of specified link account(s), furthermore, the primary account holder can select additional services offered such as transaction from another linked secondary account(s) by referring to account classification code given to the account by the bank depending on the transaction bank; the classification and management on the said primary account and linked secondary accounts could be achieved by the account number and account classification code given by the bank; thus while utilizing the existing transaction structure at banks, at the same time to process linked secondary accounts is possible.

Both the account holders and bank can benefit as use of existing data format keeping compatibility in transaction in external transaction network including payment gateway is allowed.

ADVANTAGEOUS EFFECTS

The present invention, when an account holder makes transaction on one primary account, transactions are done in real time on both said primary account and linked secondary accounts. Also, the linked secondary account can be offered to other person's account thus having the effect of making each transaction identical to any other bank account.

In addition, a holder's account, as the primary account may process inquiry and transaction on primary account with the corresponding account number and PIN, at the same time the primary account holder may open linked secondary accounts wherein one of this could be designated from other's account which the primary account defined, thus opening and transaction of plural number of other accounts through one account is possible. Furthermore, when the account holder is making inquiry and transaction on the primary account with corresponding account number and PIN (password), secondary accounts are linked for real time inquiry and transaction thus not only solve the inconveniences but also when the said primary account holder is making inquiry and transaction, as inquiry and transaction are possible either with the account number of linked accounts or names the primary account holder has given, memorizing all account numbers is not necessary.

The account of the other person which the primary account holder specifies becomes one of the linked secondary account, thus can be limited in use by the other person on inquiry and transaction to only specified account and not on the primary account and other linked secondary accounts, the other person which the primary account appoints make transaction by the account number of specified and linked secondary account number, however may selectively decided by the primary account holder on additional service functions such as transactions from other linked secondary account with reference to the merchant specific code given by the bank depending on the merchants. Classification and management of the said primary account and linked accounts may be achieve by individual account number as well as account classification code given by the bank, may still utilize the existing transaction structure at banks while having a new effect of linked account application. In addition, transaction is processed by existing data format to the external transaction network including payment gateway, outstanding work effect is generated as both account holders and bank's benefit can be maximized.

DESCRIPTION OF DRAWINGS

FIG. 11: Bank account number assignment example

FIG. 12: Secondary account definition example

FIG. 13: Example of account classification code

MODE FOR INVENTION

Described below is detailed description on enclosed drawings.

Figure 1:
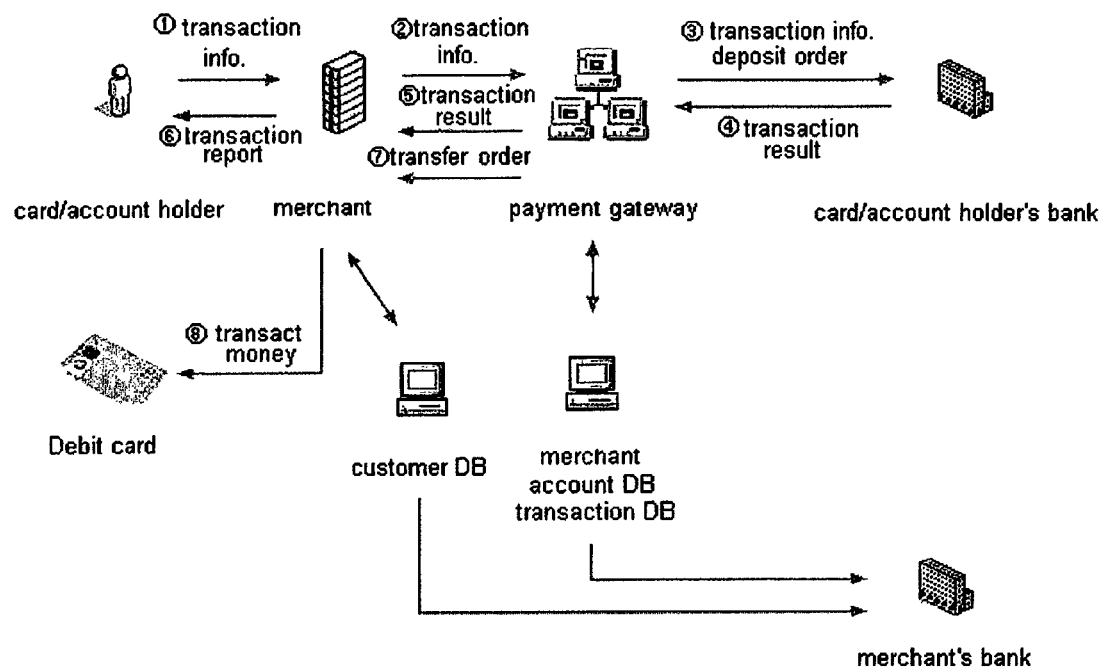
FIG. 1: Prior Art—conventional debit card transaction flow

FIG. 1 is conventional debit card transaction flow, and illustrates the transaction to the subject of payment by the card/account holder's bank and cards such as credit card, cash card, or debit card etc. Transaction could be in various types but illustrated in FIG. 1 is the case of transaction on recharging debit card. FIG. 1 shows the transaction structure between a card/account holder, holder's bank, a merchant to be paid, and the merchant's bank, especially, wherein all transaction information between bank to bank or bank to the subject to be paid is exchanged via payment gateway.

Figure 2:
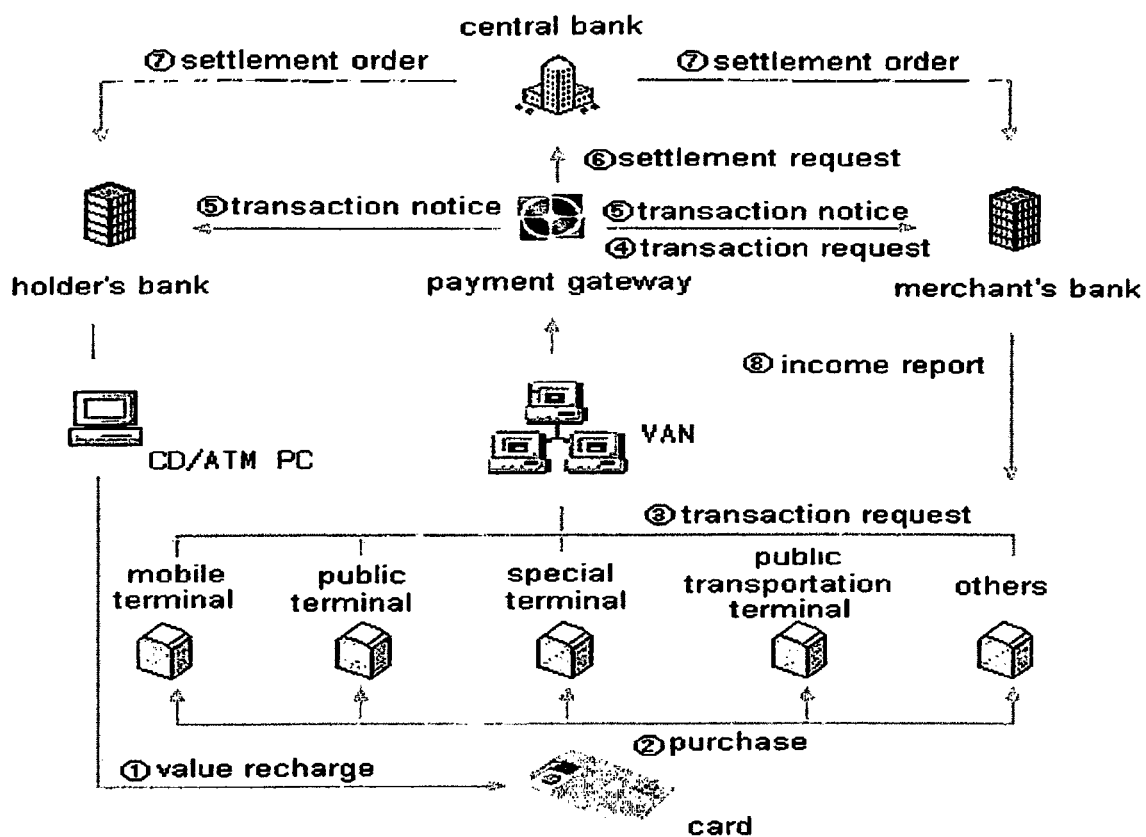
FIG. 2: Prior Art—transaction flow of conventional debit card in use

FIG. 2 illustrates transaction flow of conventional debit card in use. Transaction by card could be done by communication terminal, ATM, mobile terminal and terminals other than mentioned, and details of every transaction is notified through VAN to payment gateway and finally to the central bank, the card holder's bank and merchant's bank.

Figure 3:
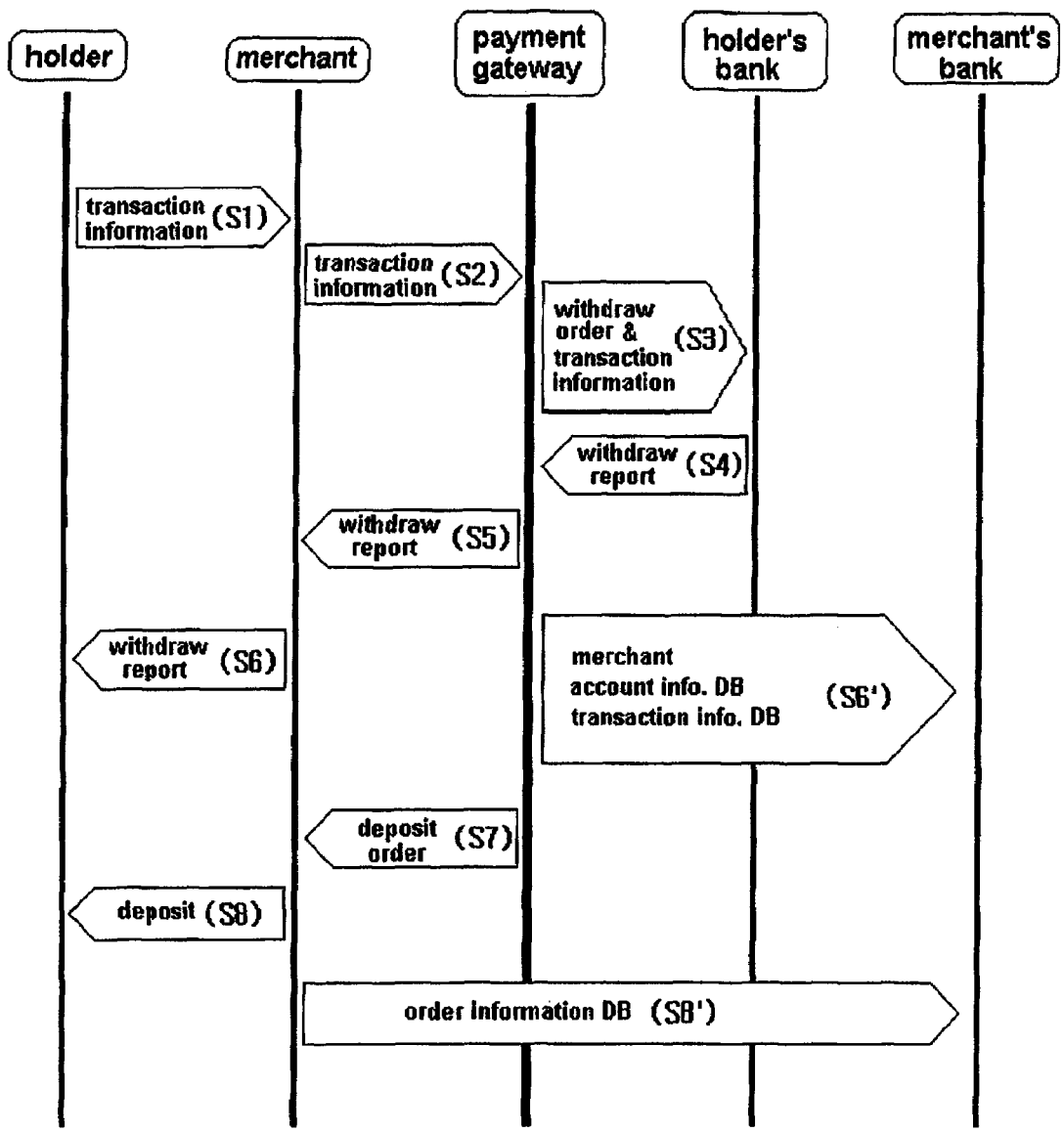
FIG. 3: Prior Art—transaction sequence of debit card transaction

FIG. 3 is transaction sequence of debit card transaction to understand the conventional transaction structure in FIG. 1. A card/account holder sends transaction information to the merchant (S1), the merchant transmits it to the payment gateway (S2), payment gateway then transmit the withdraw order together with transaction information based on the received transaction information to the account holder's bank (S3). Then account holder's bank inquires the corresponding account for transaction information and transmits the withdraw report based on the inquiry to payment gateway (S4), and this withdraw report is notified to the account holder by merchant (S5) (S6). Payment gateway provides merchant's account information as well as information to update database on transaction to the merchant's bank (S6), and at the same time, orders deposit to the merchant (S7) thus deposit is made either to account holder's account or card (S8). At this time, merchant transmit the card/account holder's order information in database form to the merchant's bank (S8'), thus allowing the merchant's bank to compare and save the database from payment gateway (S6') with order information database (S8'), confirming transaction.

Figure 4:
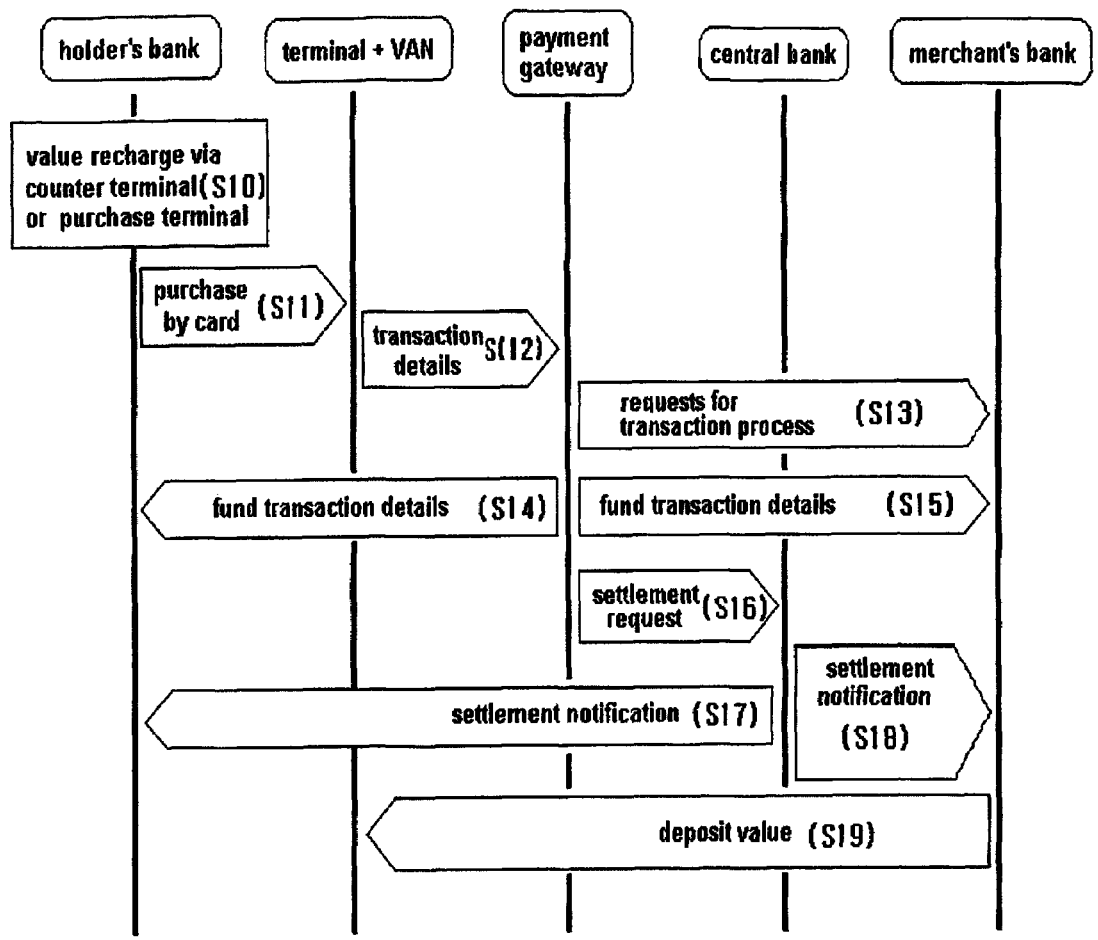
FIG. 4: Prior Art—transaction sequence of debit card in use

FIG. 4 is the transaction sequence of debit card in use as a prior art example shown in FIG. 2, illustrating the data flow on using a card, etc., via transaction terminal. First, is the case where a certain value is charged to card through card/account holder's bank (S10), purchase takes place using the card (S11) and transaction details are transmitted to the payment gateway by terminal (S12). At this time, payment gateway, referring to the transaction, requests for transaction process at merchant's bank (S13). Payment gateway notifies fund transaction details to the card/account holder's and merchant's bank, respectively (S14), (S15), and requests for settlement of the transaction to the central bank (S16).

The central bank, upon receiving the request for settlement of the transaction (S16), in return notifies settlement of the transaction to the card/account holder's and merchant's bank respectively (S17)(S18), and as a result, from the merchant's bank to the card/account holder's account the transaction amount is deposited (S19) is processed at the terminal.

The conventional transaction process described in FIGS. 1 to 4, have been exemplified by value chargeable debit card however, transactions in other credit dealings or using accounts if made at individual transaction terminals, banks, authorized financial business firms, etc., can state that the transaction process is identical as the transaction done via payment gateway and the central bank.

Existing transaction processes mentioned above are described with focus on current transaction system, however, can further elaborated in relation to the structure of existing computer network for transaction as below to clarify on the technical structure.

Figure 5:
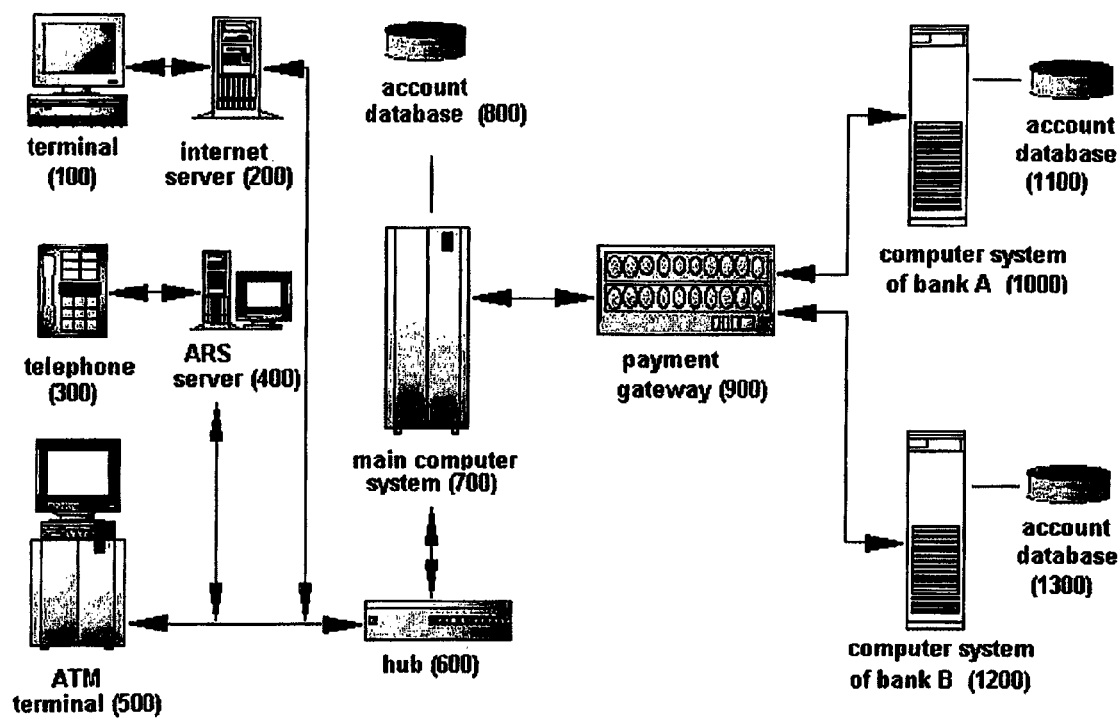
FIG. 5: Prior Art—example of a Bank Transaction System

FIG. 5 represents the existing bank transaction system with focus on the card/account holder's bank.

In the transaction structures as previously described in FIGS. 1 to 4, to a main computer system (700) in charge of all transaction an account database (800) is connected, and card/account holder's account information at this account database (800) is stored and managed by the main computer system. The main computer system (700) is normally connected to 2 types of network; one is a route connected to the payment gateway (900) as described in FIGS. 1 to 4, the other is external transaction equipments connected by external network connection hub (600). It is not shown in FIG. 5, however, the external network connection hub (600) also can be combined with security functions such as firewalls, as well as added with other functions as necessary. Some of the typical external transaction equipment are; terminal (100) connected via internet server (200) and wire & wireless telephone (300) which creates transaction data by DTMF function; the ARS server (400) which transmits the created transaction data by DTMF function to the main computer system (700) via external network connection hub (600); the ATM terminal (500); and various transaction equipment including counter terminals. The payment gateway (900) is connected to computer systems at different banks (1000),(1200) which carries out transactions between banks, and each computer at the banks (1000),(1200) is connected to the database (1100),(1300) storing each account holder's account information respectively. In FIG. 5, shows only the bank computer systems (1000),(1200) connected to payment gateway (900), however, card transaction terminal, etc., via VAN, and other authorized financial business firms computer network could also be connected.

Figure 6:
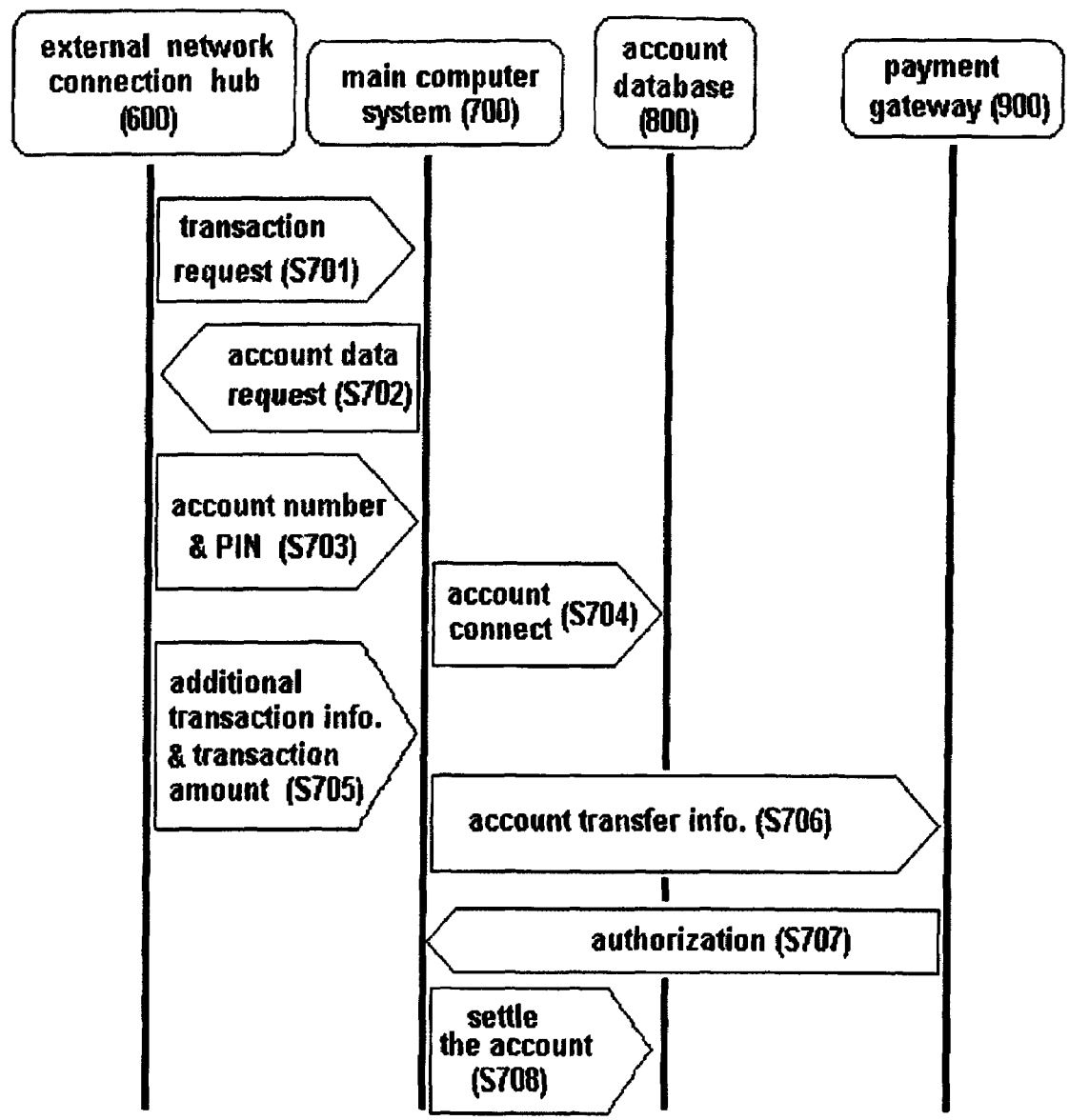
FIG. 6: Prior Art—transaction sequence via external network connection hub

FIG. 6 describes the flow of current (existing) transaction from bank transaction system via external network connection hub (600). When transaction request (S701) is generated from the one of terminal (100) via internet server (200), wire & wireless telephone (300), ARS server (400), and ATM terminal (500), the main computer system (700) which received the request in return sends back the account data request (S702) to the equipment that sent specific transaction request. The equipment earlier requested for transaction sends accounts data such as account number and PIN(S703) to the main computer system (700), and the main computer system (700) with reference to the information received retrieves the corresponding account data from account database (800) and connects (S704) to the main computer system (700). As the additional transaction information is received from the equipment that requested for transaction, and transaction amount (S705) is deposited to settle the corresponding account (S708). When referred transaction result requires for transaction to other bank such as other bank account transfer, main computer system (700) transmits account transfer information (S706) to payment gateway (900) and acquire authorization from corresponding bank prior to settle the account (S707).

Figure 7:
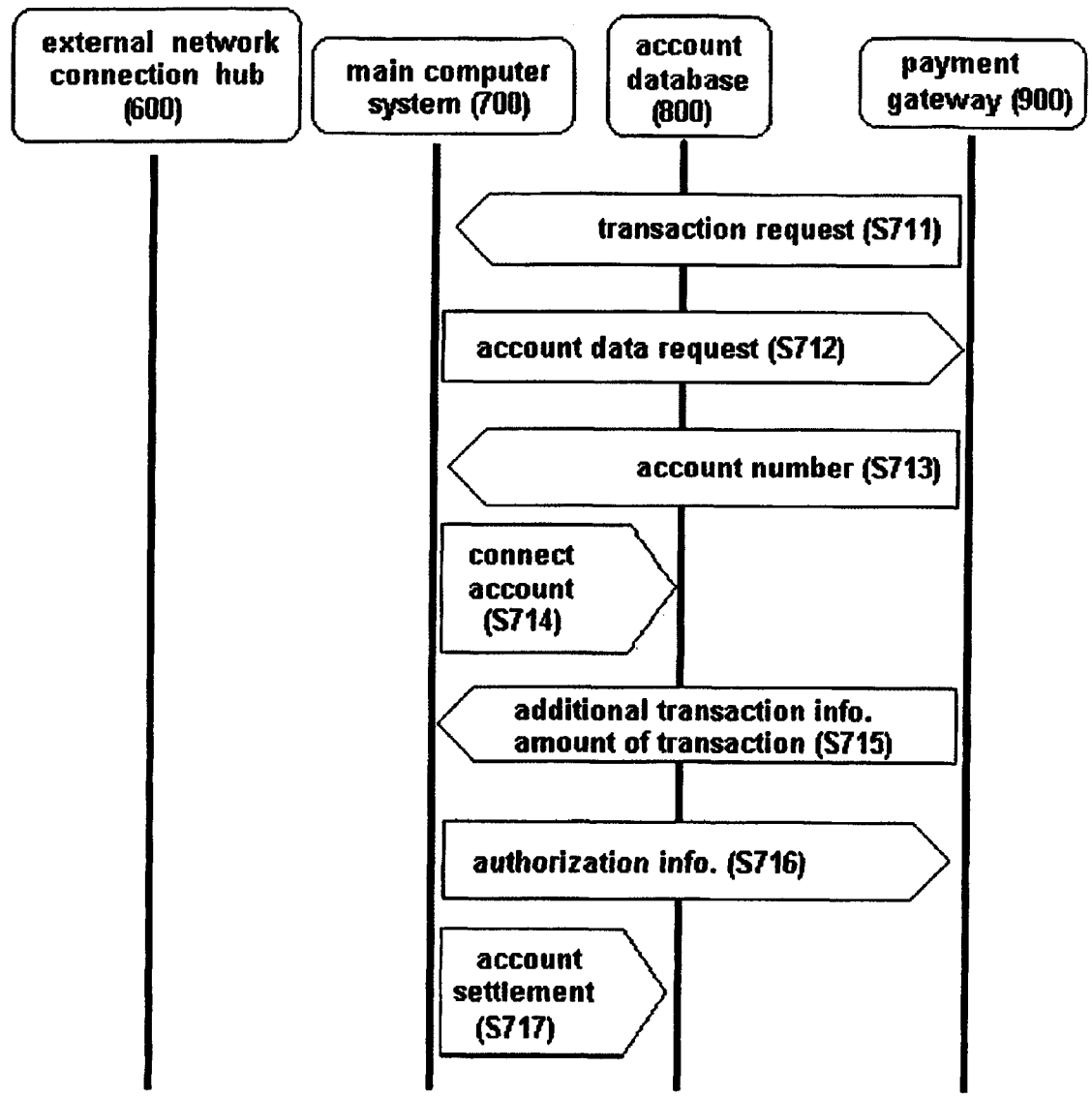
FIG. 7: Prior Art—transaction sequence via payment gateway

FIG. 7 represents the flow of conventional transaction system in bank transaction via payment gateway (900) in FIG. 5. Upon the transaction request (S711) from other banks' computer system (1000),(1200), card transaction terminal connected via VAN, or computer network of other authorized financial business firms, the main computer system (700) which received the request in return sends account data request (S712) via payment gateway to the computer system or the terminal where corresponding transaction request is received from.

The unit requested earlier for transaction sends account data such as account number (S713) to the main computer system (700), and the main computer system (700) with reference to the information received searches for the corresponding account from account database (800) and connects (S714). In this case, the computer system of other bank (1000),(1200), card transaction terminal connected via VAN, or computer network of other authorized financial business firms, processes the transaction based on assumption that the card/account holder is verified through PIN, etc., and does not re-verify, however, may add another PIN for transactions such as withdraw as needed. As additional transaction information, such as registered number of the transaction equipment, and transaction amount (S715) is received from the unit that requested for transaction, transmit authorization information (S716) by confirming the account, and settles the corresponding account (S717). When referred transaction result requires for transaction to other bank account transfer from the card/account holder's bank, main computer system (700) transmits account transfer information (S706) to payment gateway (900), acquire authorization from corresponding bank prior to settle the account (S708). In due process, may add program(s) to limit or selectively perform the transaction request via bank computer system, such as corresponding account's balance, limits per transaction, number of transaction per day, the transaction banks, etc.

In the conventional transaction structures as mentioned above, a bank with a main computer system (700) must go through payment gateway for external transaction, and as any modification or improvement is practically impossible as it requires for overall changes. Considering each individual account holder's trend, today's bank customers, i.e. account holders, mostly have plural number of accounts at more than one bank. Therefore, as current account holders must perform transaction per each bank, not only have to remember all account numbers and PIN per each bank, but to accept the limitations due to differences in service and work hours even if online transaction between banks is allowed. In addition, the plural accounts of a customer could be organized to be merged into one account, nonetheless, this not only is practically meaningless in reality for the customer has to classify the accounts by expenditure but is also expected to increase inconvenience in management.

Figure 8:
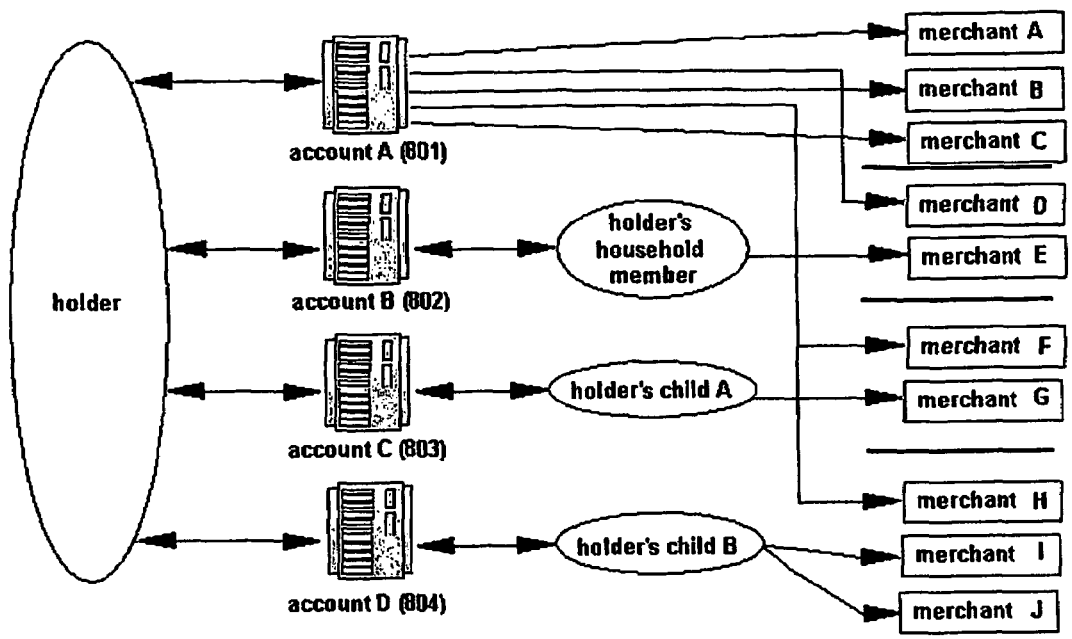
FIG. 8: Example of account structure for an account holder

It is elaborated in FIG. 8, as an illustration of an example showing conventional structure of bank accounts on the site of the holder. It represents an ordinary account holder of a household, having the holder's account A (801), holder's household member's account B (802), and/or holder's child A's account (803), holder's child B's account (804), etc., wherein each accounts have merchant subject of payment by means of either card or cash transaction. In FIG. 8, account holder's account has 3 merchants A, B, and C respectively; holder's household member's account B has 2 merchants D and E; and/or holder's child A's account has merchants F and G; and child B's account has merchants H, I, and J, respectively.

In this type of transaction structure, if the account holder is representing the whole household, i.e. the account holder is in charge of whole household financially, may frequently have to make transactions not only to his/her own merchants A, B, and C, but also to the member's merchants D, and/or child A's merchant F, and child B's merchant H.

To take a more specific example for easy understanding, those merchants can be account holder's child A and B's tuition fee for school and other additional institute fee, and spouse's credit card bill. Tuition fee paying to schools of account holder's child A's and B's, despite that it is simply bringing the sum to the bank or school by children, it is very well known than quite a number of accidents occur in due process. These also can be paid through GIRO and bill paying counters at bank, however, it cause much trouble as the transaction structure between banks become so complicated thus requiring a long time until payment is actually deposited into the school's account, and furthermore, decentralized managing system requires quite long time until the transaction report, as known.

Figure 9:
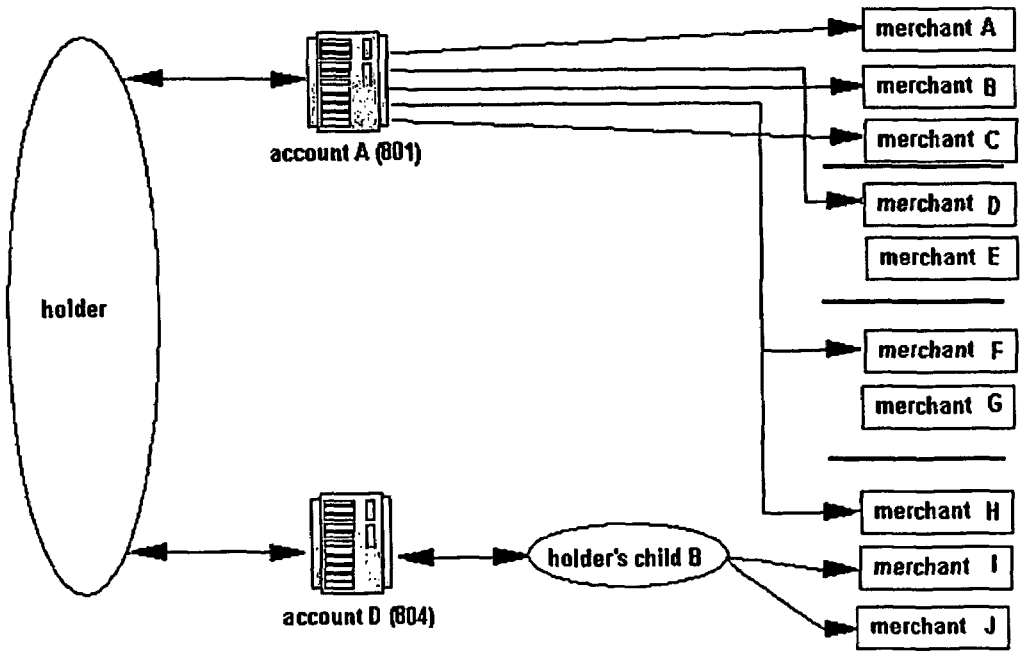
FIG. 9: Example of account transaction structure

To describe the detailed system of the present invention, transaction construction of account holder's child B's account D (804) has been taken out among the structure in FIG. 8. In FIG. 9, merchants I and J represent child B's own merchants directly paid from child B's account D (804) while merchant H is although charged to child B but is actually paid from the account holder's account A (801) such as tuition fee or fee for other institutions, as describe above. In FIGS. 8 and 9, plural number of merchants to be paid from existing account holder's account A (801) will exist, and most of them having specific payment deadlines, the account holder will have difficulties in managing money right in time.

Figure 10:
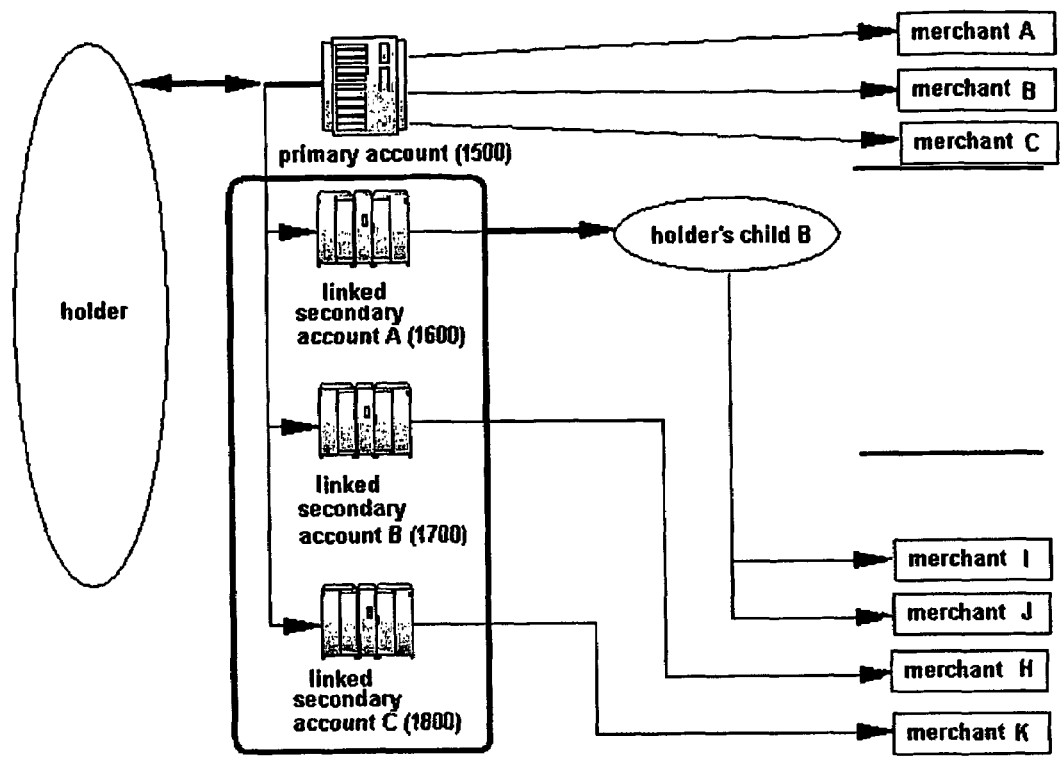
FIG. 10: Transaction system example

Construction by the invention as a solution is illustrated in FIG. 10. Structure in FIG. 10 is subject to the existing transaction structure in FIG. 9 described previously. First, account holder's account is the account already open or newly open account which referred to as primary account (1500) in the invention. The account in primary account holder's child B's name is the linked secondary account A (1600). In addition, linked secondary account B (1700) and linked secondary account C (1800) are newly created and opened. When the primary account holder is making transaction from the primary account (1500), the construction previously described in FIG. 5 is used in transaction same as any other ordinary bank accounts by online or offline, using bankbook or card at terminal (100) connected via internet server (200), wire & wireless telephone (300) via ARS server (400), and the ATM terminal (500). The core construction of the invention is, when the primary account holder makes transaction on primary account (1500), transaction made at linked secondary account A (1600), linked secondary account B (1700), and linked secondary account C (1800) should be processed in real time. Furthermore, primary account holder's child B is offered by his/her linked account A (1600), however, connections also should be made for individual transaction to linked account B (1700) or linked account C (1800) depending on the merchants concerned.

In order to carry out these functions, classification of accounts must be preceded and the example of assigning bank account numbers is illustrated in FIG. 11. An universal account number is composed of a identification number called bank (branch) code, the number to represent the type of bank account (for example, savings account, checking account, deposit account, etc.), the serial number of the account, and error checking code such as CRC code in order to check for any computer error of the complete account number. Conventional account number assignment does not limit the digit numbers nor positioning of the assigned digits of each account, furthermore, may increase the number digits if necessary. A description in the invention on classifying the accounts to process transaction, assigning of numbers that are not used in other account for classifying the account type is preferable as in FIG. 11. In the FIG. 11, '77' is assigned as an example. The primary account number previously described may be assigned in various way, however, it is preferable to assign a number with '0' as the last digit. Primary account holder's child B's account number described previously is assigned by fixed rules. In the example in FIG. 11, it shows that '1' has been assigned as the last digit in account serial number. Therefore, a primary account number with the last digit as '0' will have linked account with identical account number except the last digit being '1'. In the example in FIG. 11, total 99 accounts exists aside from one primary account, which all could be assigned as linked secondary accounts and linked to the primary account. However, only the account of primary account holder's child B's account with last digit number '1' will be used as an ordinary transaction account for deposit, withdraw and credit cards; all other linked accounts can be limited as merchant specified accounts wherein the merchant is predetermined. These merchant specified accounts and a primary account, and primary account holder's child B's account can have account classification codes for each account in addition to the account number (bankbook number) by the bank system for management and control. FIG. 11 shows an example of individual accounts with account classification codes in addition to their account number, wherein account classification code is '00' for primary account number and account classification code '01' for linked secondary account A. The account classification code also can be extended more in digits to specify merchants or transaction management number by the bank.

FIG. 12 illustrates a sketch of individual account name. According to the description on the said bank account number assignment, if the primary account holder of the account serial number with the last digit as '0' is James', the account of Jason who is a child of James becomes a linked secondary account with account serial number with the last digit '1'.

James who is the holder of primary account may make transactions to all linked secondary accounts including Jason's account by the structure to be described later, wherein each linked secondary accounts can be named, Jason's account as Jason's allowance and rest of the linked accounts can be named as described in FIG. 11, be named as Jason's tuition fee, Jason's institution fee, etc., respectively. As described in FIG. 11, a large number of accounts also can be named as such through off-line subscription at the bank counter. Furthermore, there are methods to use transactions services via internet and wireless internet, ARS or mobile communication and details on these will be described later.

FIG. 13 illustrates an example of classifying the account classification code at the bank where the said accounts are opened. Since the account with account classification code '00' is the primary account, it is the primary account of account group including secondary accounts as described in FIG. 11 and FIG. 12. The primary account as described in FIGS. 10 to 12, may process inquiry and transaction in real time on the primary account and all linked secondary accounts, not only used independently by each account's number, but also do inquiry and transaction by the name the primary account holder has assigned. The account having account classification code '01' is one of the linked secondary accounts and may be used as another account holder's independent account. Rest of the linked secondary accounts are merchant specified accounts defined by the primary account holder, i.e. only the specified merchant is allowed to connect.

In the example in FIG. 13, '99' represents school, '98' the authorized institute, '97' is for mobile communication bill, and '96' transportation fee, wherein these merchant specified accounts will only pay to each of the predetermined merchant. In other words, the person who has been assigned to account with account classification code '01' (who is primary account holder's child B in the previous description) could only do inquiry or transaction on those with account classification code '01'. When the predetermined merchants such as schools, institutes, mobile communication, transportation card, etc., requests for other primary account holder's card transaction, etc., the primary account holder's bank will compare it with the account classification code for transaction from the corresponding account.

The account numbers in the examples until now are in decimal number, and the primary account and linked secondary accounts are differentiated by one last digit to help understanding however, each of the primary account number can have the number intervals of 100 or up to 1000 number steps, assigning 10 to 100 number steps to the respective linked secondary account groups, wherein each linked accounts are assigned last one digit between 1~9 in the 10 digits and expand to 01~99 in the 100 digit as necessary; could also serve same purpose by assigning the digits in front or middle of the complete account number at convenience and security. Based on the account holder's bank computer system, the required digits of account number can be converted into binary numbers, i.e. in binary number if a section of the account number '0000' in binary number as the primary account and '0001' in binary number as the secondary account as the primary account holder appoints, and rest as the linked secondary account numbers. Thus, if account number classification is described by any of number system, on the total account number of L digit in a number system N, from M-digit which is smaller than L digit a portion is taken, and one of them is assigned to the primary account, another one to the account which the primary account holder appoints; and among the account number groups expressed in M digits of a number system N which is smaller than digit numbers of L, could be assigned as linked secondary accounts except already mentioned two of primary and appointed accounts accomplishing the account allocation of the present invention.

According to these account numbering rules, to a primary account, the holder of the primary account can appoint other holder's account number in plural and assign numbers per each to possess linked secondary accounts respectively.

Previously described constructional characteristics on the said accounts could be summarized as follow:

Firstly, the account, as the primary account, may process inquiry and transaction with it's account number and PIN.

Secondly, the primary account holder can open linked secondary accounts, wherein one of those may be the account of another holder which the primary account holder appoints.

Thirdly, when the primary account holder is processing the primary account with it's account number and PIN (password), the secondary accounts are also linked to process inquiry and transaction real time.

Fourthly, when the said primary account holder is processing inquiry and transaction on the linked secondary accounts, it could be done on each of the account with the account number of linked secondary accounts or with the account names defined by the primary account holder.

Fifthly, the other account holder's account the primary account holder appoints, is one of the linked secondary accounts, and the other holder above can be limited on processing inquiry and transaction only to the said appointed account and not to the primary account and other linked secondary accounts.

Sixthly, the other account the primary account holder appoints can process transaction by the account number of the appointed linked account, however, the bank can process transaction from another linked secondary account depending on the merchant with reference to the merchant classification code.

Seventhly, the classification and management on the primary account and linked secondary accounts is achieved by the individual account number and account classification code given by the bank.

Therefore, holder's bank must be able to offer data service such as the following in order to offer the services in the invention previously described in FIGS. 10 to 13 in addition to the existing account management data.

First, the banking system have to assign separate identification code (bank account type, etc.) to the primary account (1500) and linked secondary accounts (1600), (1700), (1800) for the service in the invention;

second, possess measures to save and manage the names of linked secondary accounts assigned by the primary account holder together with the primary account number;

third, as a measure to save and manage the above names of linked accounts assigned by the primary account holder together with the account number, must save and manage by assigning the determined account classification code to linked secondary accounts' name;

fourth, connecting function to process transaction from the corresponding account by comparing information on the said merchants with the account classification code when the predetermined merchants request payment on other account holder's card, etc., wherein the other account holder has been assigned account with account classification code '01'.

As for the data to process primary and linked secondary accounts, the primary account holder may have to submit needed information through applying at the primary account holder's bank counter by filling up the forms for the primary account and linked secondary accounts, and the desired names for each respective linked secondary accounts however, the more preferable way would be processing inquiry and transaction by possessing the accounts of invention through communication equipment or data terminals.

Figure 14:
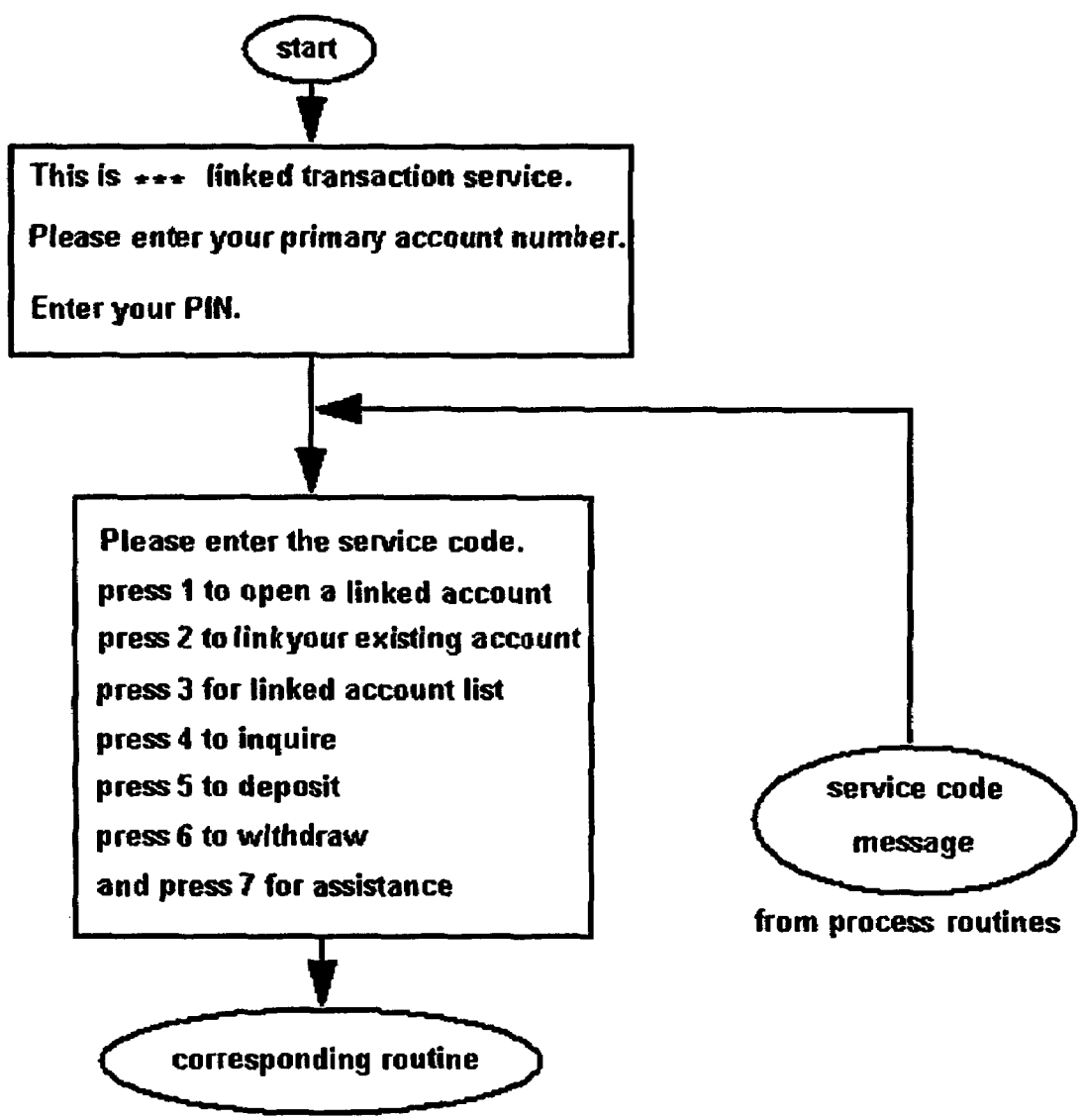
FIGS. 14~20: Flow of linked secondary account services via ARS messages

FIG. 14 illustrates the flow of message for the linked account service via ARS. The primary account holder verified by account number and PIN, selects the services for linked accounts with key buttons of a telephone, which will be connected to corresponding service routine as ARS server decodes. Each routing, to be described later, upon completion, returning to each service code is possible by the primary account holder's selection to the inquiries. ARS service in FIG. 14 is achieved by the ARS server (400) connected to the wire & wireless telephone in FIG. 5, an identically structured service may be achieved by SMS via mobile communication and wireless internet, as well as via terminal (200) connected to internet server (200) in FIG. 5, a construction with equal function.

Figure 21:
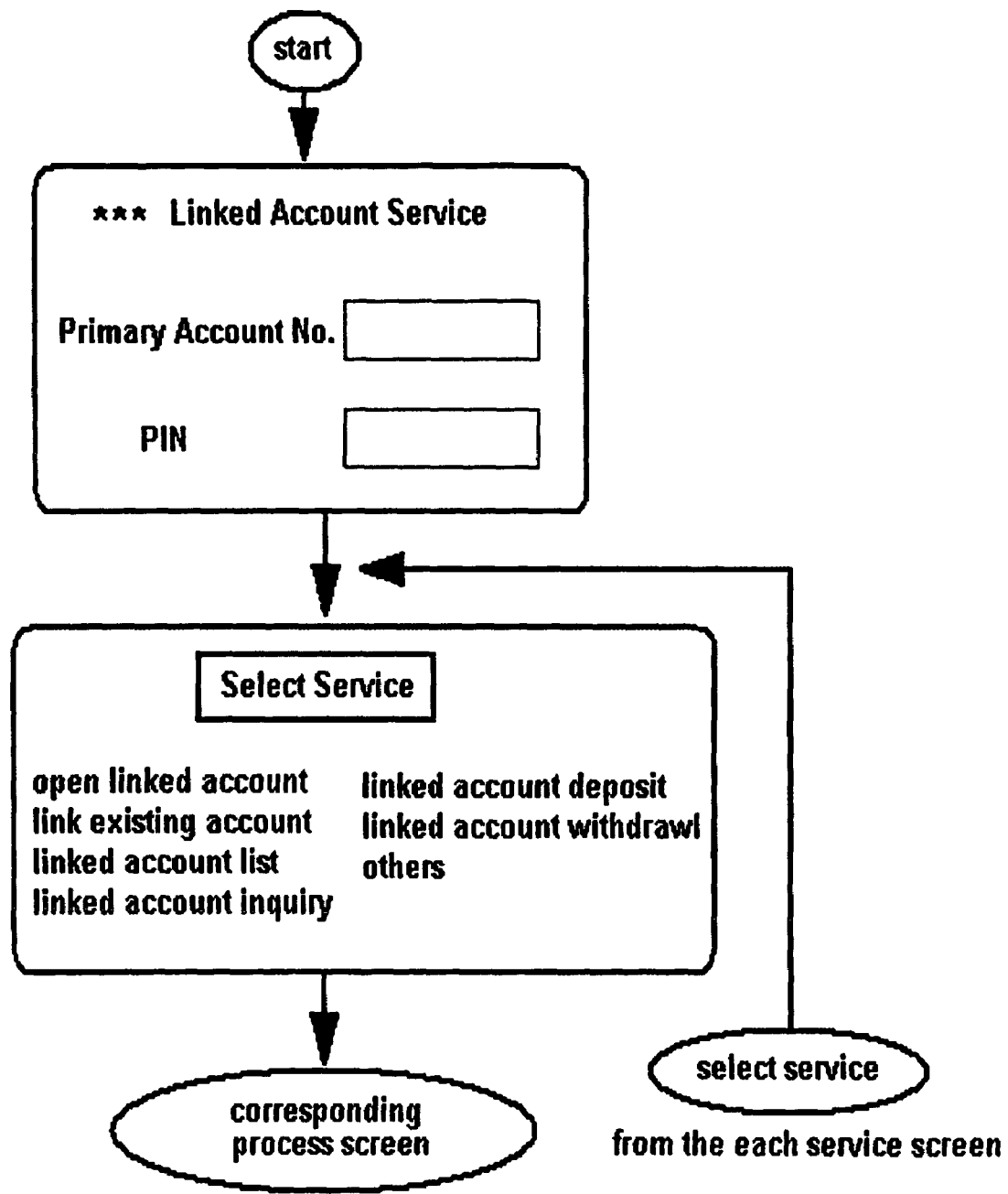
FIGS. 21~27: Flow of linked secondary account services by SMS and/or via internet

FIG. 21 illustrates an example of providing the same service content via short message service or internet. The service in FIG. 21 is very much alike in providing linked account services of the invention except that the primary account holder personally has to move curser, etc., to make selections in the displayed screen and the messages are in text form.

Figure 15:
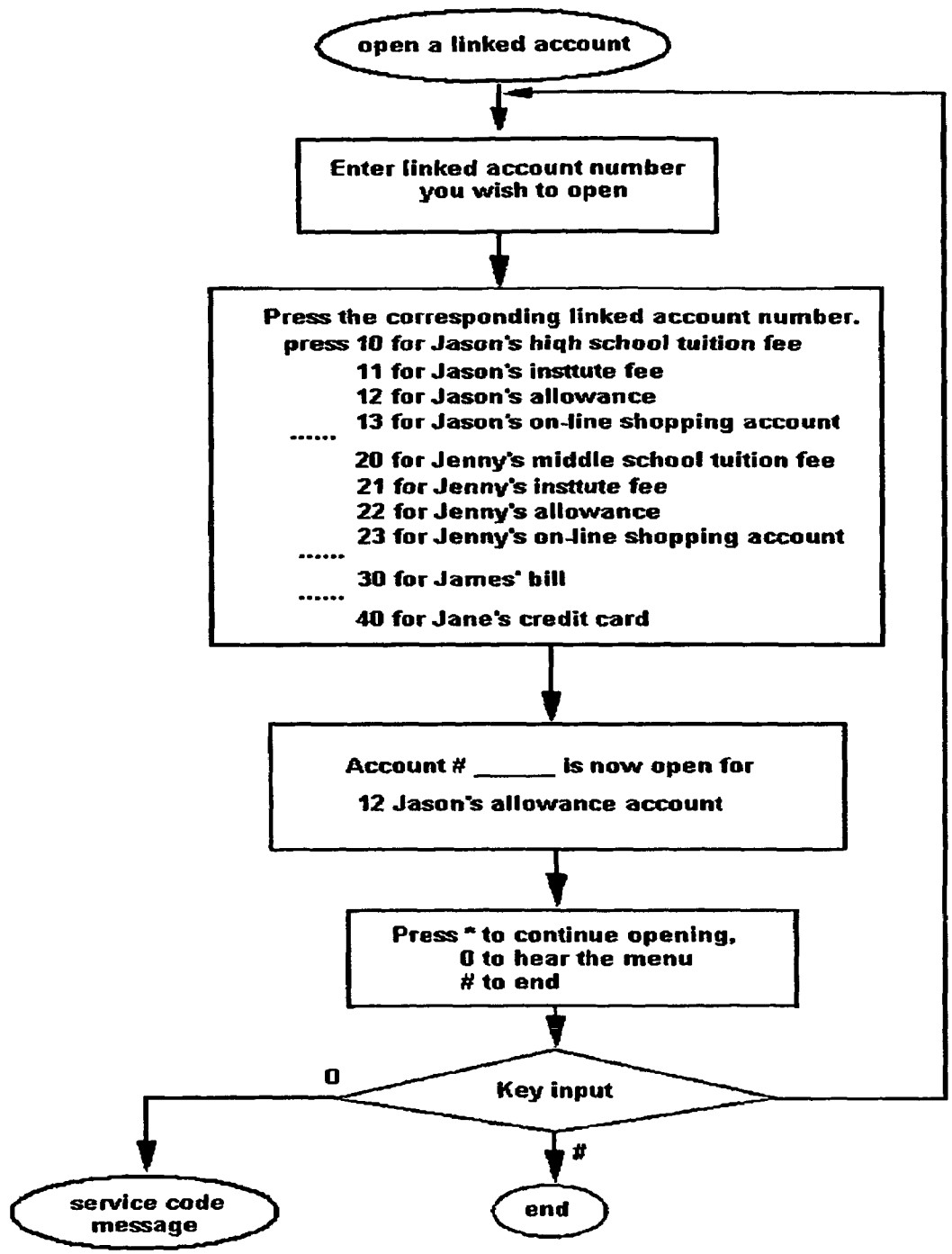
Figure 22:
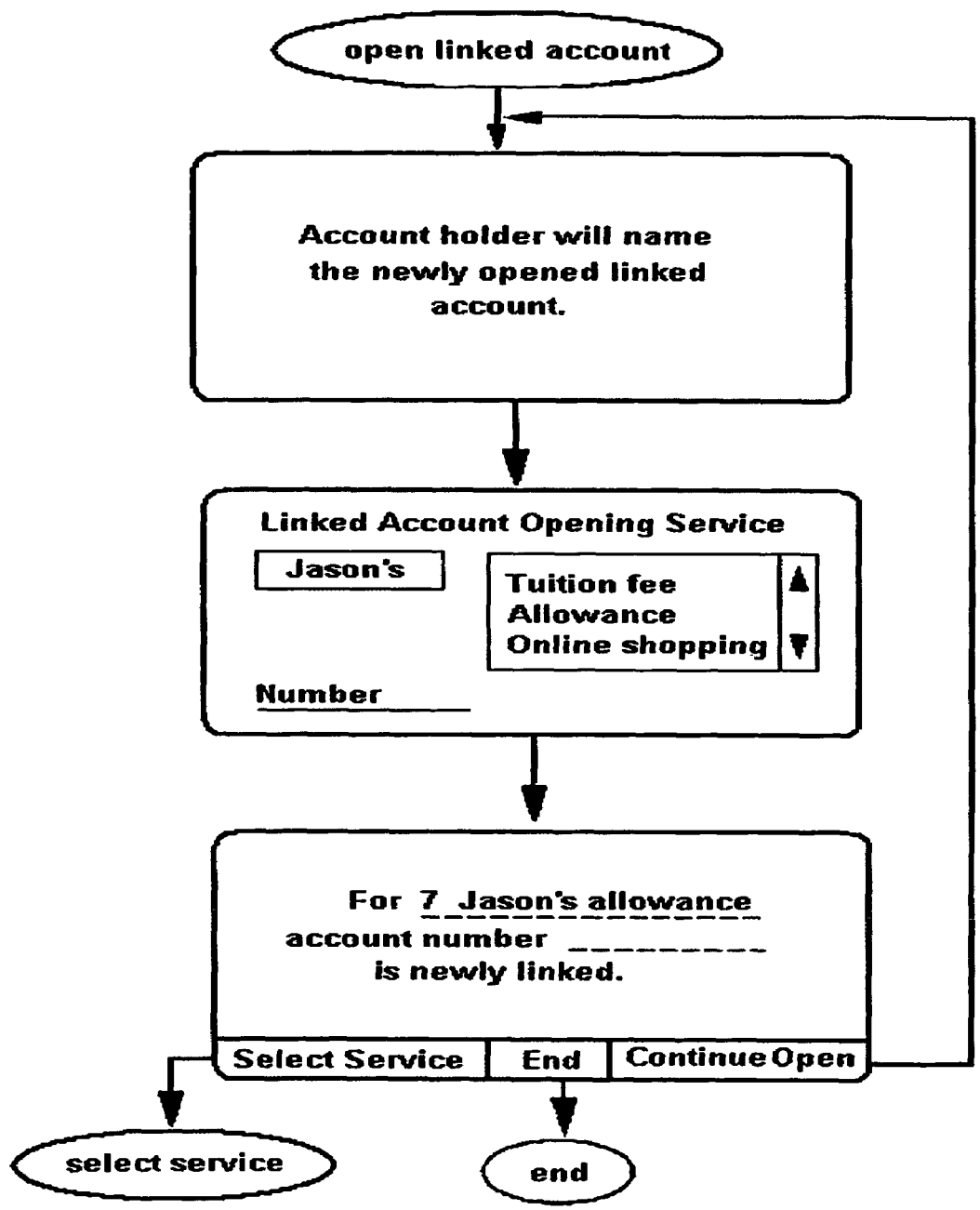

FIG. 15 is the ARS routing for applying and acquiring new linked accounts via ARS to a pre-opened primary account, wherein another linked account's holder appointed by the primary account holder is more than one and under presumption that information on above future account holder such as name and linked account name have been provided at the bank. FIG. 22 illustrates the flow of identical service exemplified by SMS via mobile communication or wireless internet service or via terminal (100) connected to internet server (200) of FIG. 5.

Figure 16:
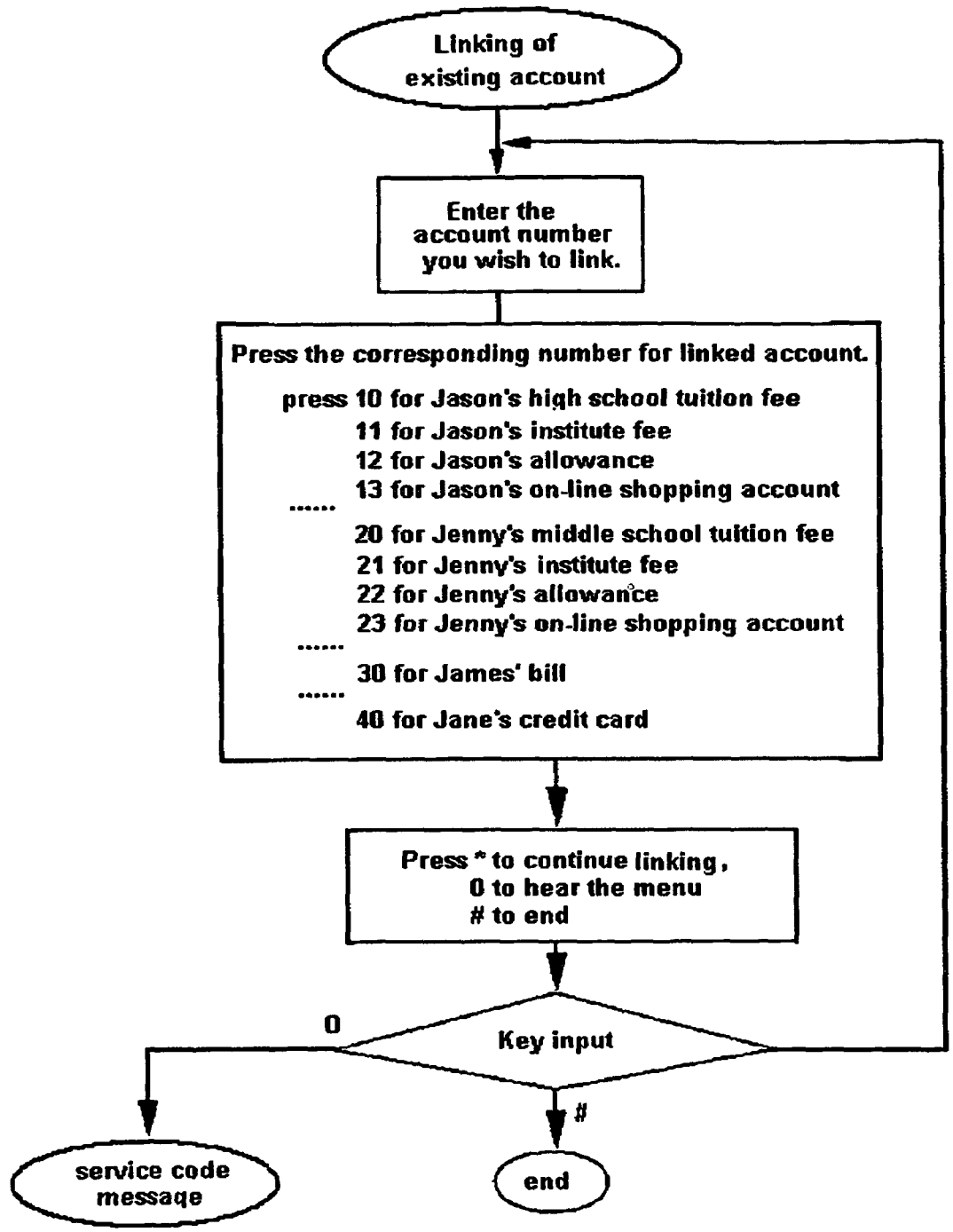
Figure 23:
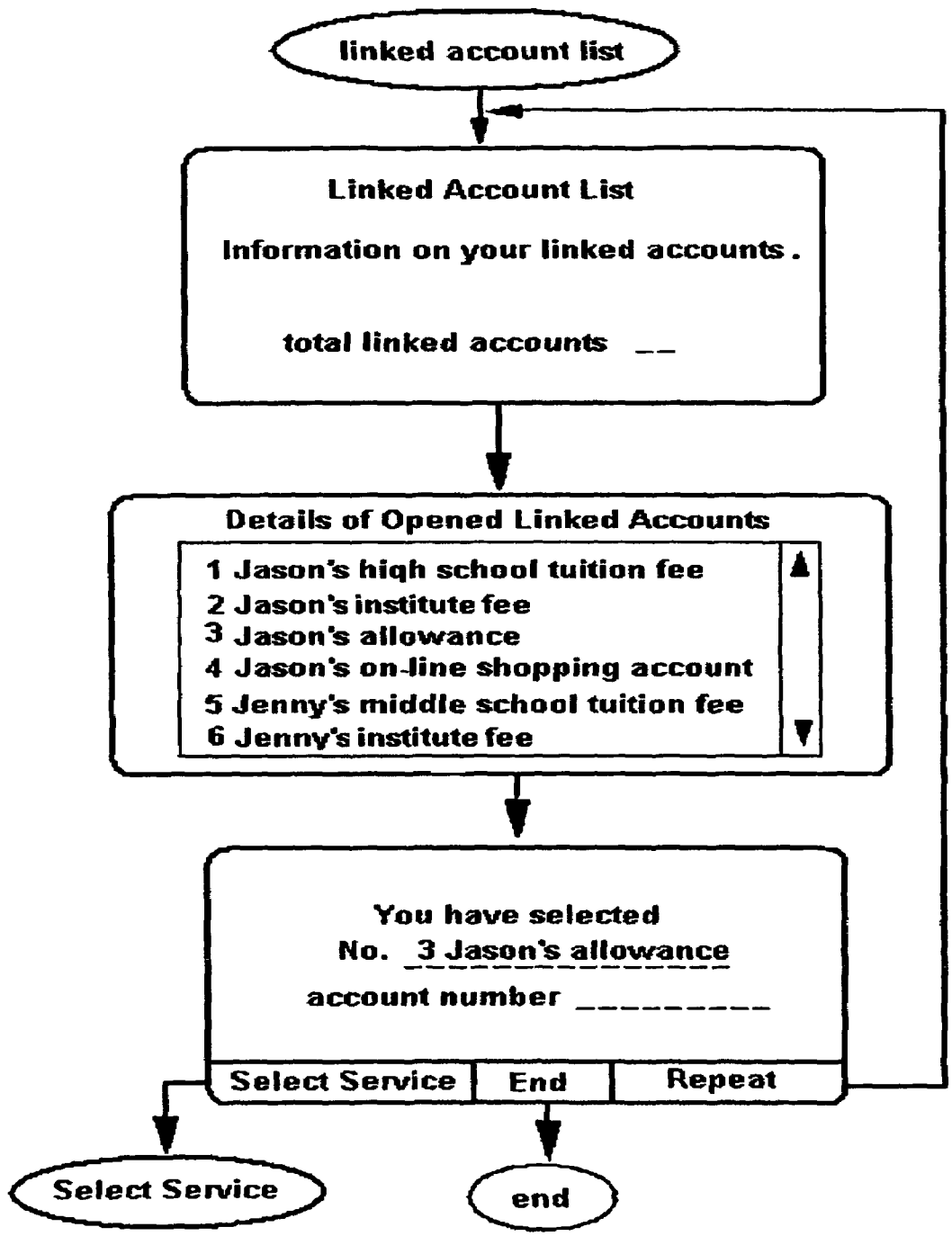

FIG. 16 shows service message to designate as linked accounts when both the primary account and the accounts to be designated as linked secondary accounts have already been opened; FIG. 23 exemplifies the service through SMS via mobile communication or wireless internet service, or via terminal (100) connected to internet server (200) of FIG. 5.

Figure 17:
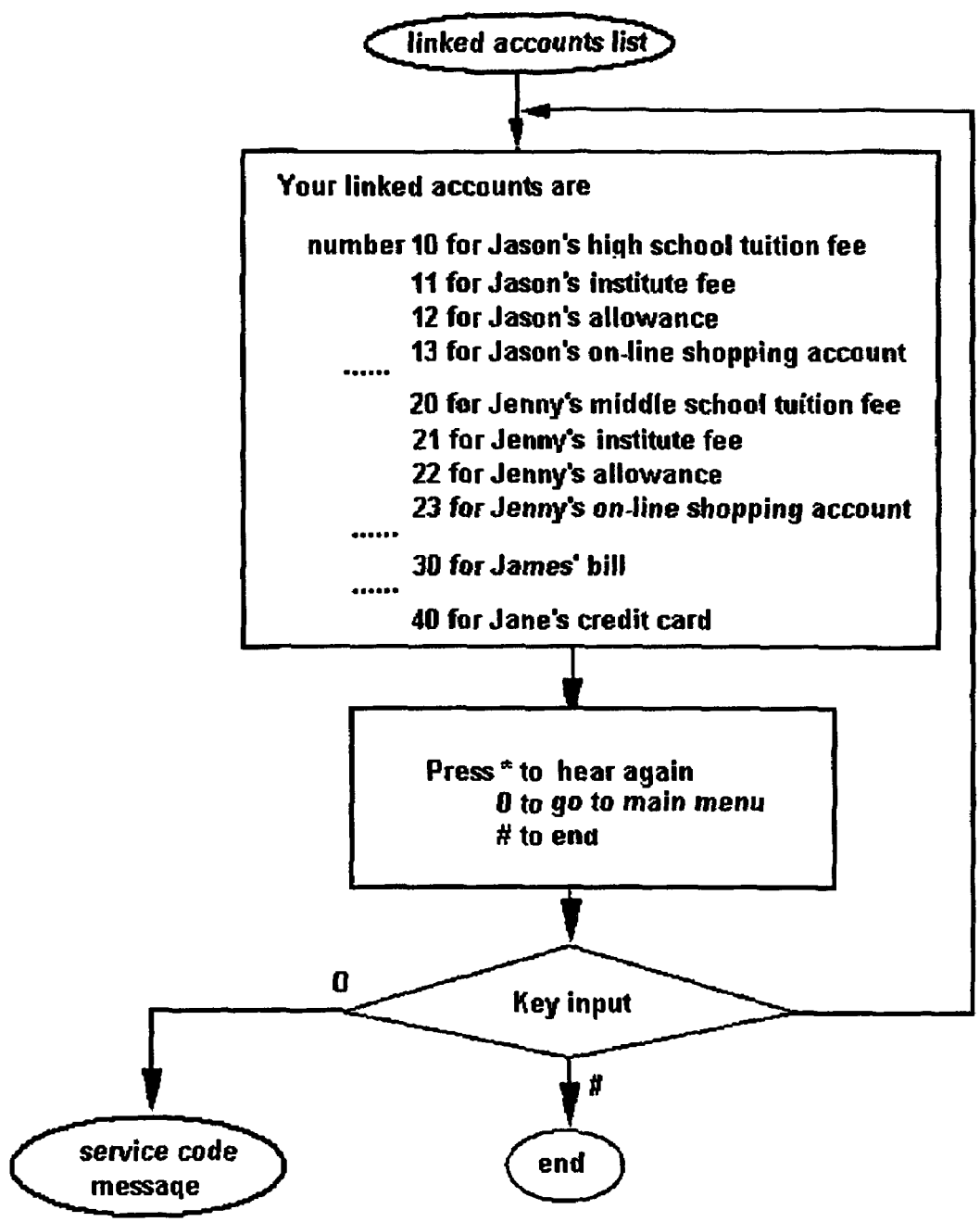
Figure 24:
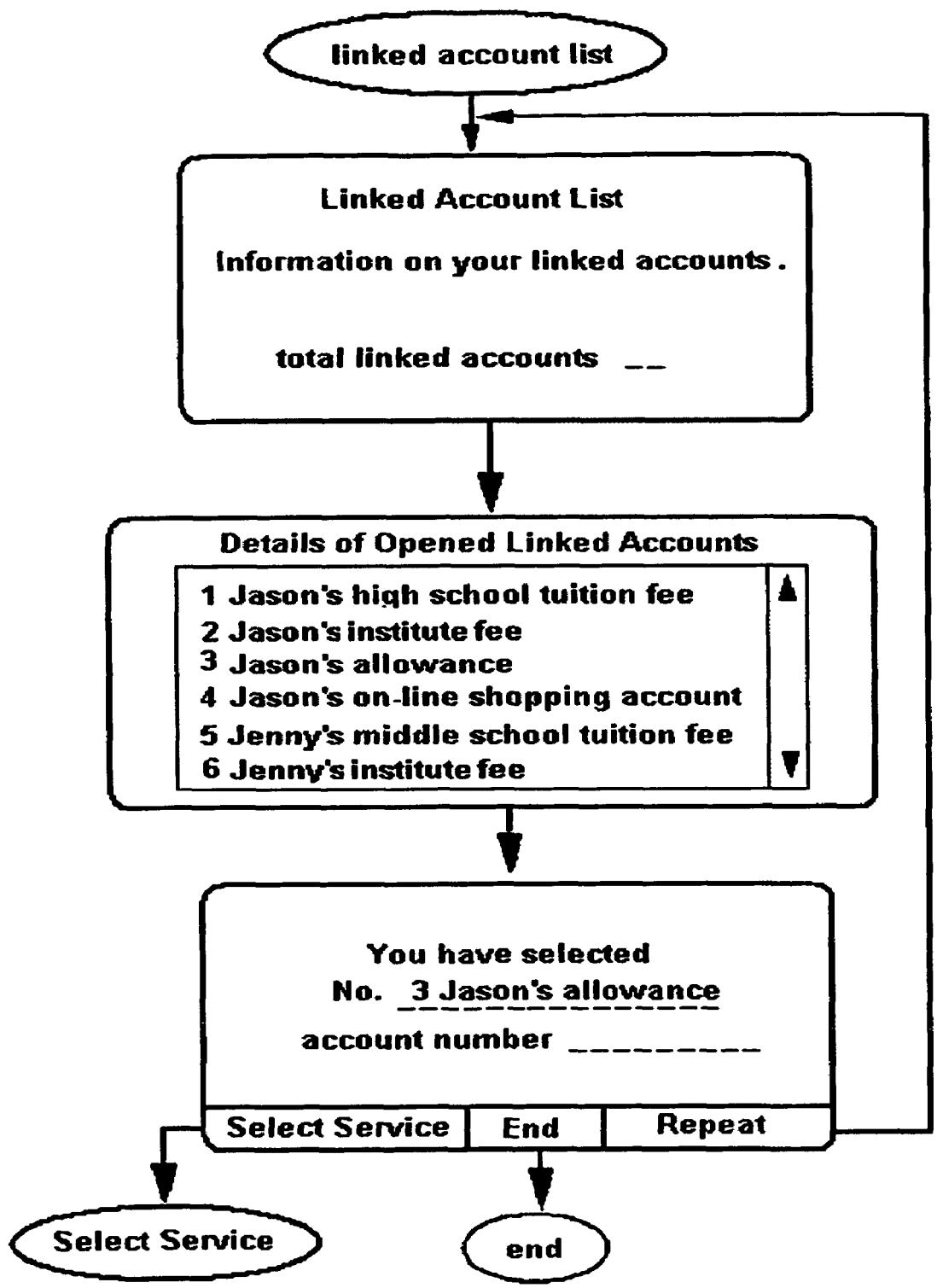

FIGS. 17 and 24 illustrate service message flow on guiding pre-opened primary account and linked secondary accounts in ARS as well as SMS and wireless internet.

Figure 18:
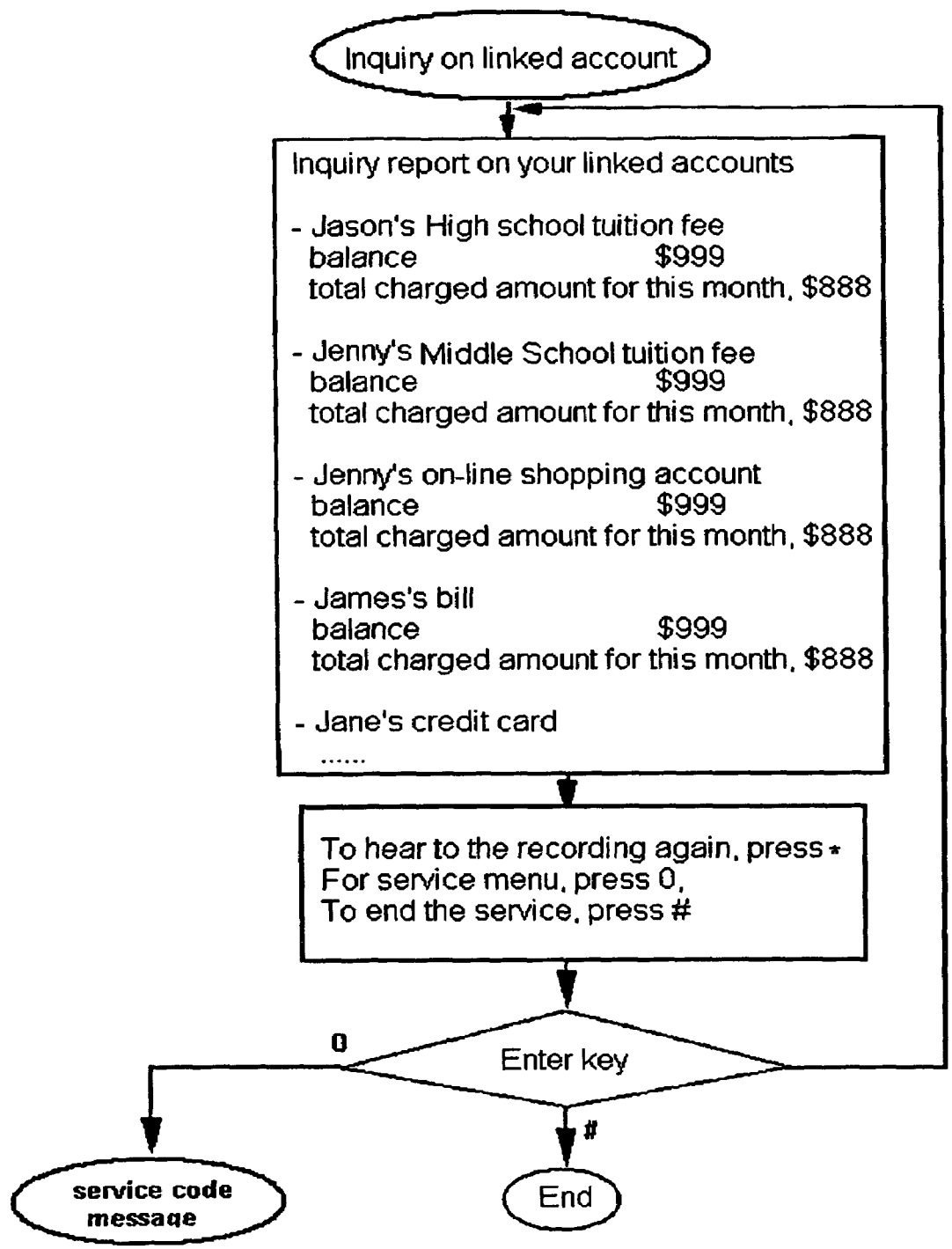
Figure 25:
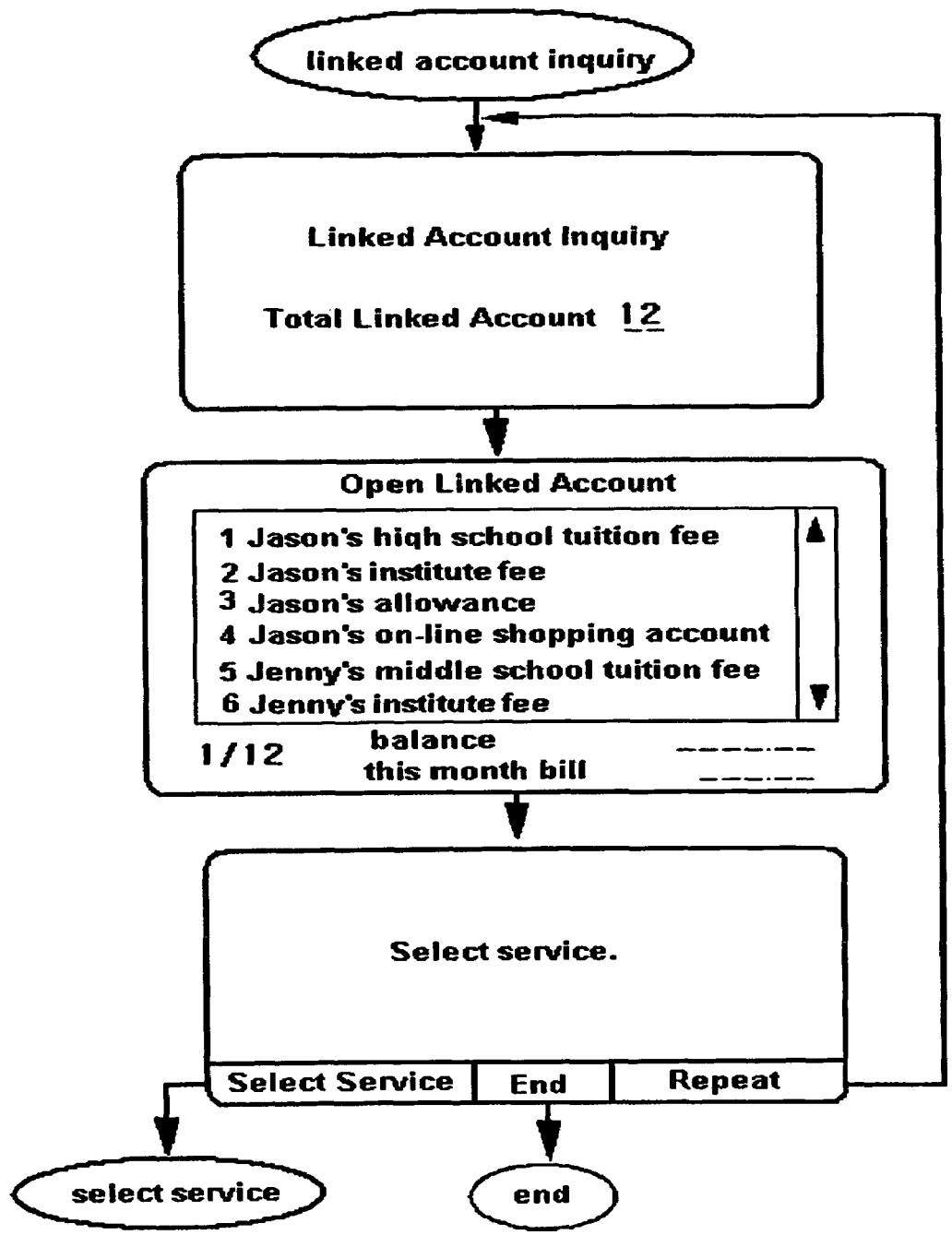

FIGS. 18 and 25 illustrate balance summary inquiry service message flow on pre-opened linked secondary accounts.

Figure 19:
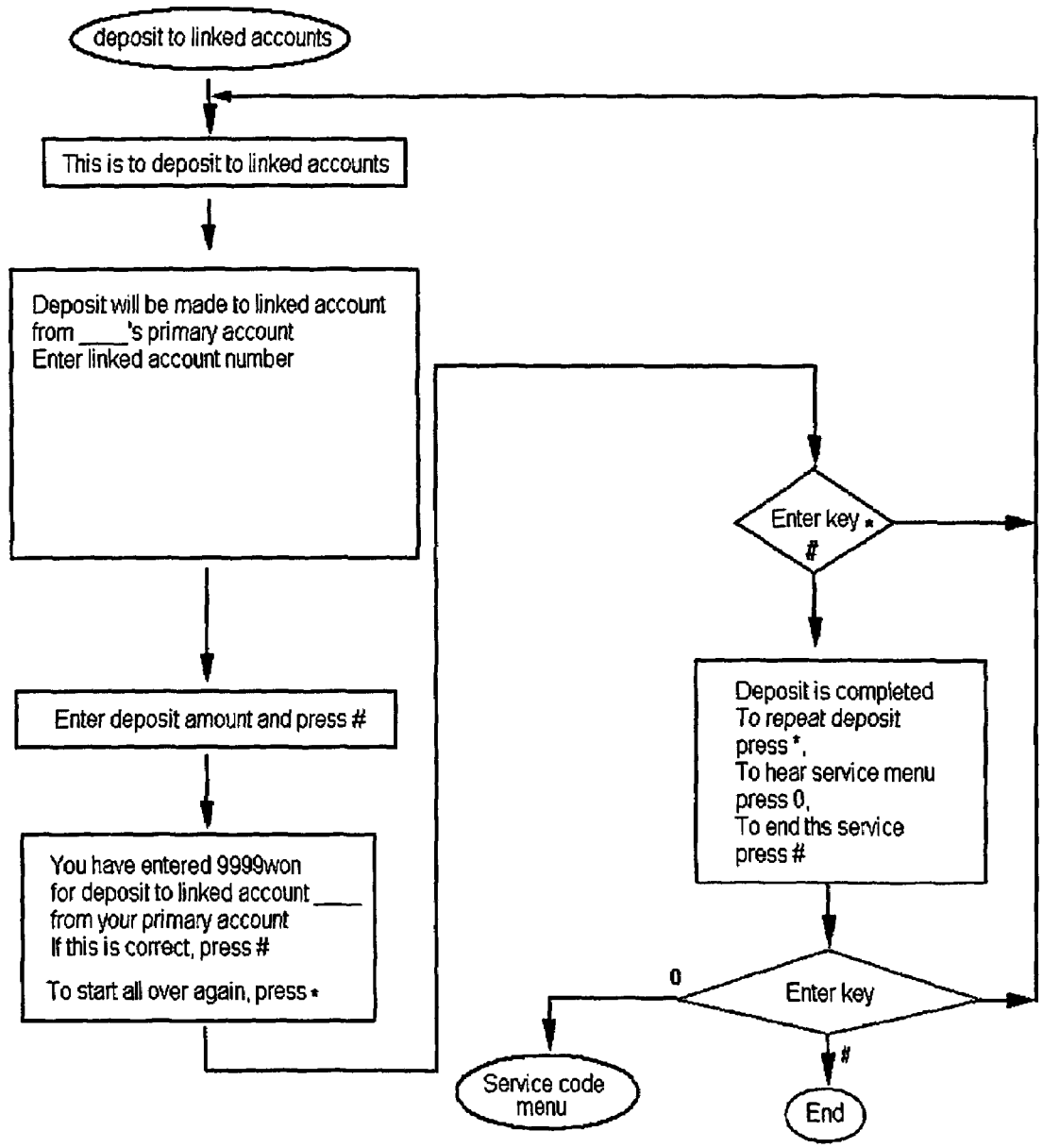
Figure 20:
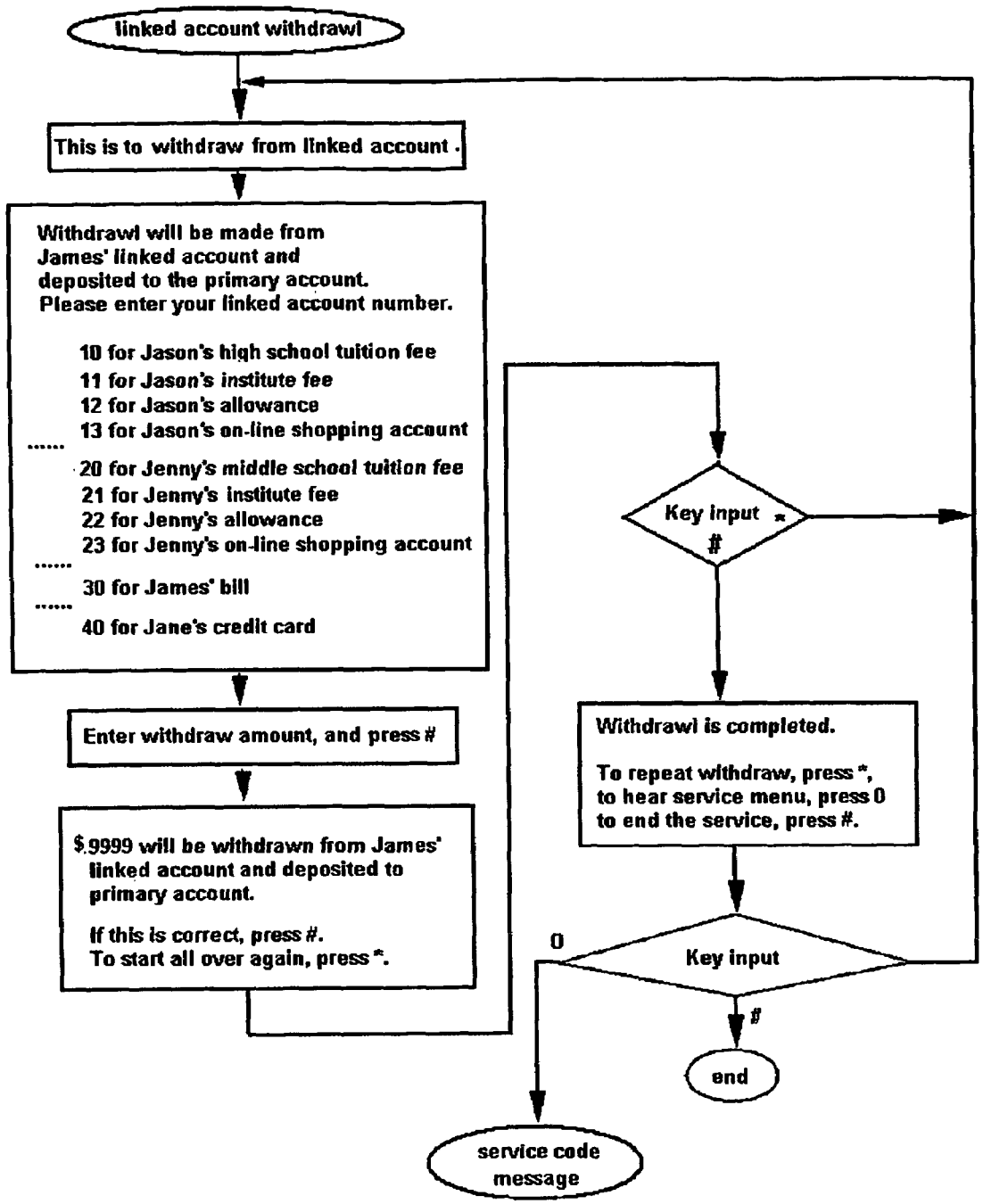
Figure 26:
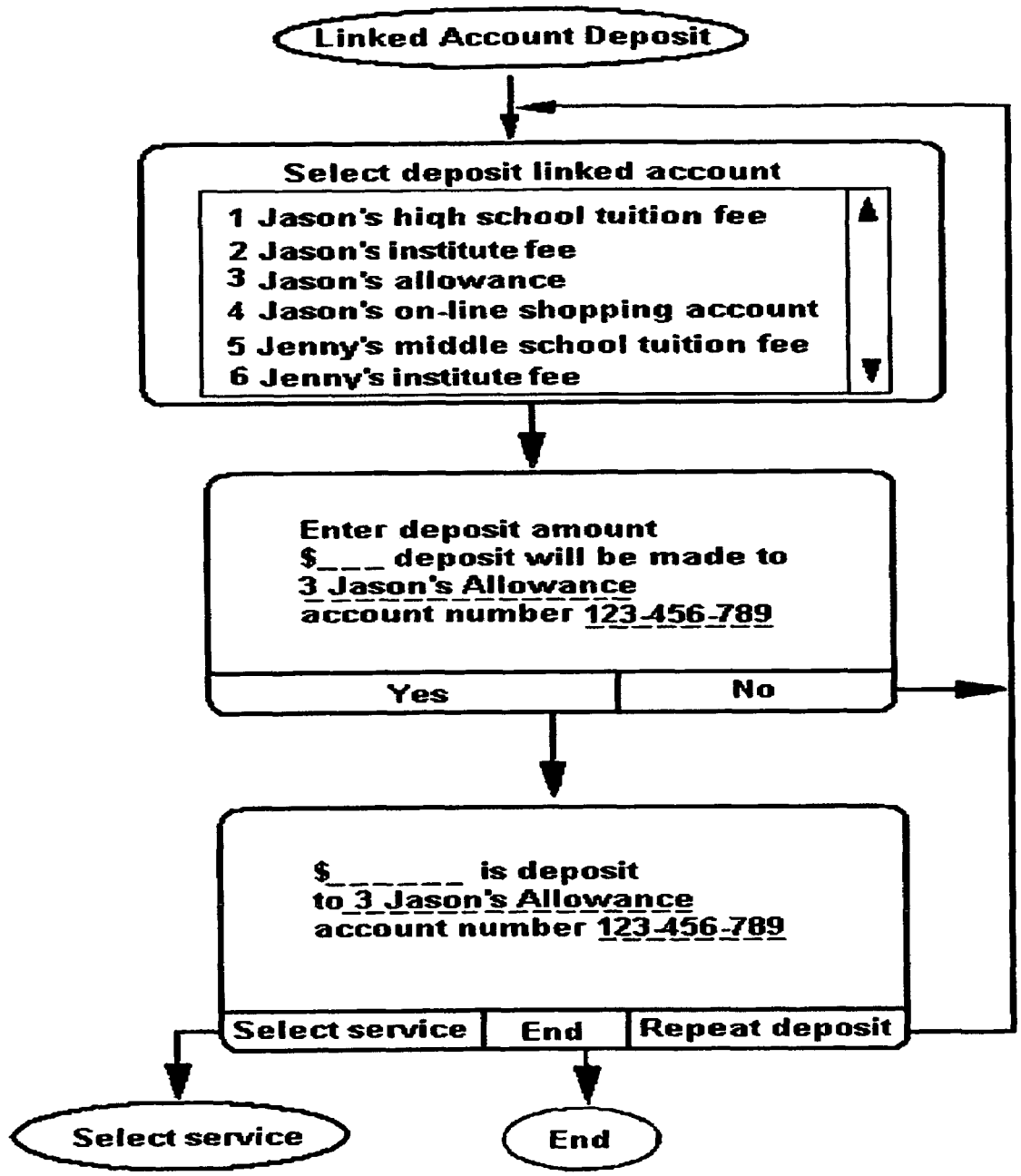
Figure 27:
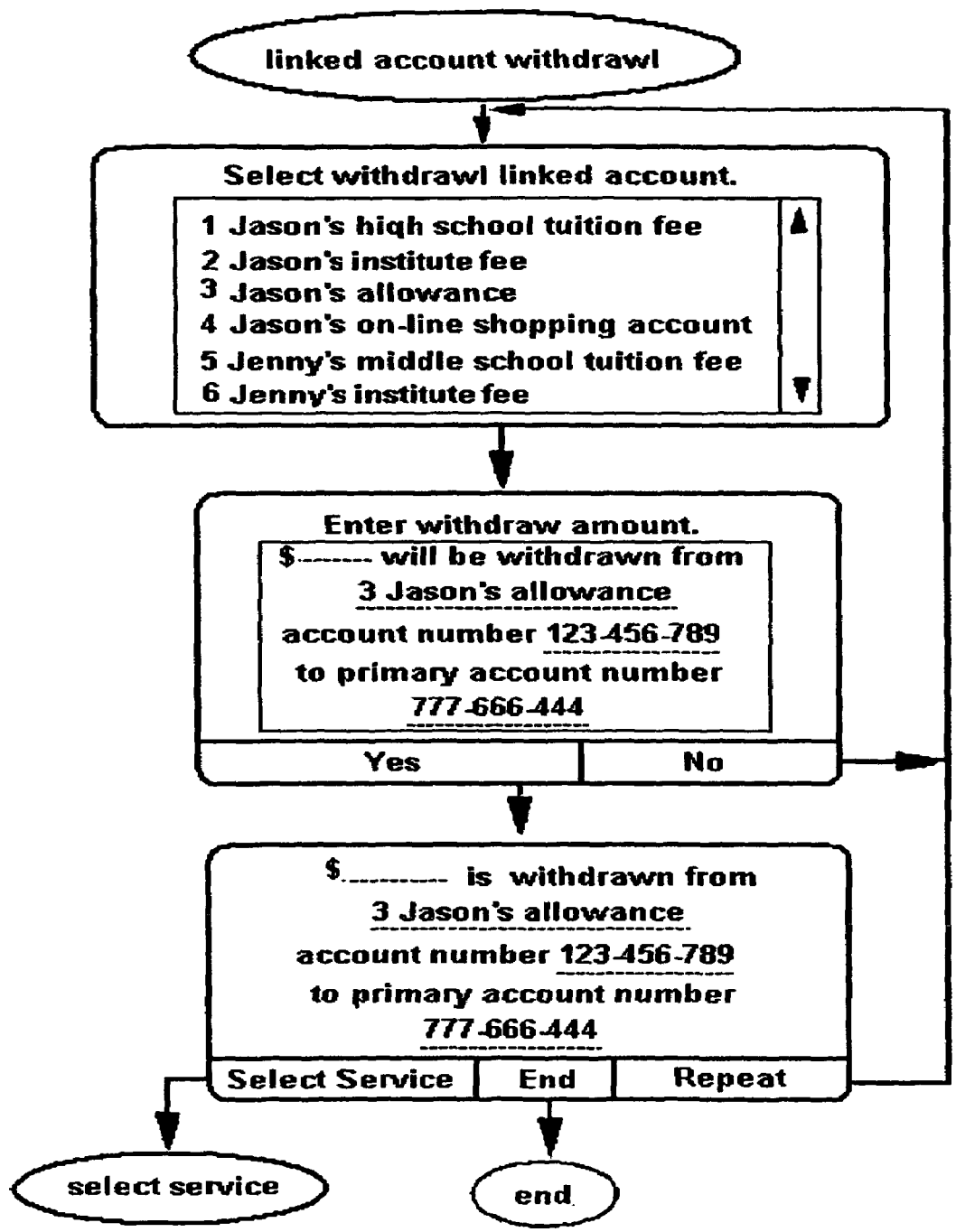

FIGS. 19 and 20 illustrate message service to deposit and withdraw within the primary account and selected linked secondary accounts by ARS; FIGS. 26 and 27 show the same message service by SMS via mobile communication or wireless internet service or via terminal (100) connected to internet server (200) of FIG. 5. Examples of this service, as described previously, ARS service is done by wire or mobile telephone (300) and the ARS server (400) connected to; identically structured service also may be done by SMS via mobile communication or wireless internet service or via terminal (100) connected to internet server (200) of FIG. 5.

Figure 28:
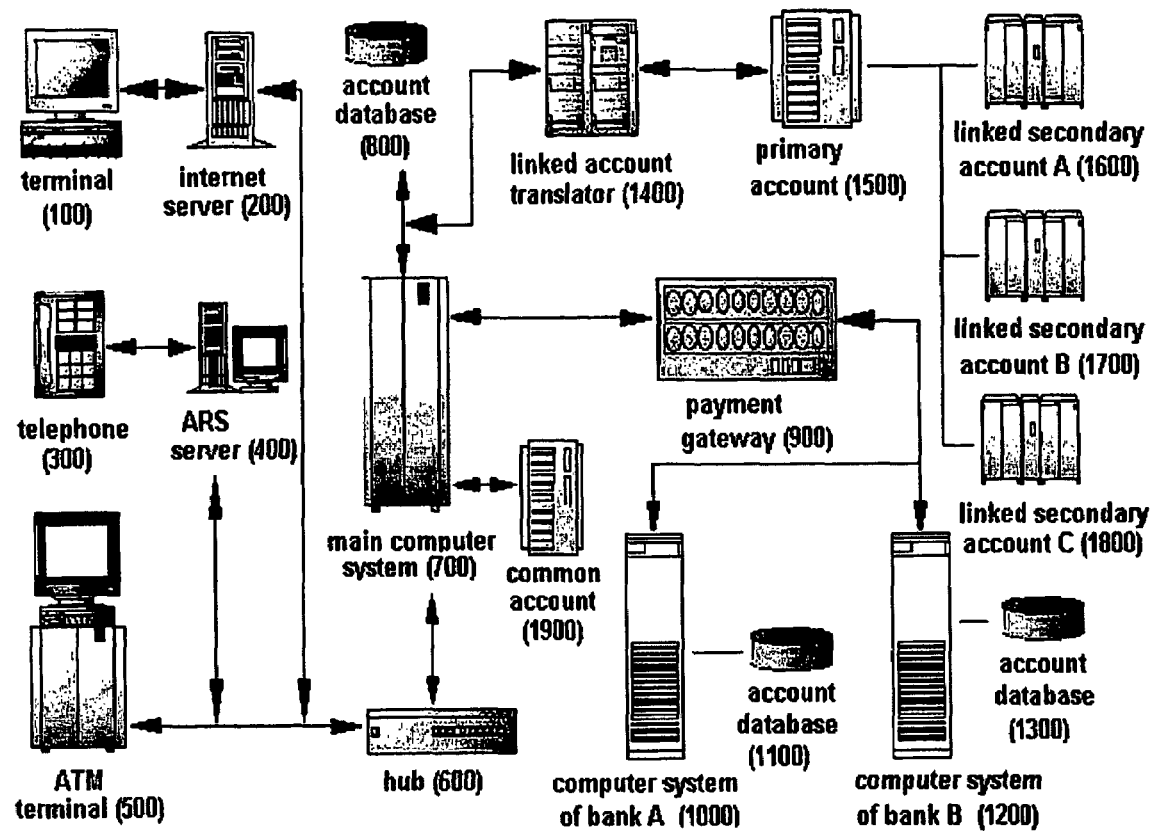
FIG. 28: System for linking accounts service

The structure of the computer system in the present invention to offer link service within primary account and linked secondary accounts is illustrated in FIG. 28.

To the main computer system (700) in charge of all transaction at the account holder's bank, an account database (800) is connected, and at this account database (800) the account holder's account information is saved and managed by the main computer system (700). The main computer system (700), in general, is connected to two types of network; one is the route connected to the payment gateway (900) as previously described; and the other is to external transaction equipment connected to the external network connection hub (600). Security measures such as firewalls could be combined to the external network connection hub (600), and supplementary functions can be added as needed. One of the well known external transaction equipments is the ARS server (400) which transmits transaction data created by DTMF measure, etc., at the terminal (100) connected via internet server (200), at wire & wireless telephone (300), to main computer system (700) via external network connection hub (600), and the ATM terminal (500), and in addition to mentioned equipments various other transaction equipments including counter terminals are used. KTFC payment gateway (900) is connected to other bank's computer system (1000),(1200) processing inter-bank transaction, and each holder's account information is driven to database (1100), (1300) at their respective bank (1000),(1200). FIG. 28 illustrates as only the bank computer systems (1000),(1200) connected to the payment gateway (900), however, as previously described not only the card transaction terminal, etc., could be connected via VAN, but other authorized merchant's computer network could also be connected.

In the invention, for the linked account service to these basic construction, together with the account database (800) connected to the main computer system (700) a linked account translator (1400) is disclosed, and transactions at accounts are processed by main computer system (700) via above linked account translator (1400).

To the linked account translator (1400) above, primary account (500), linked account A (1600), linked account B (1700), linked account C (1800), etc., are connected to process transaction according to main computer system (700)'s requests.

Above linked account translator (1400), at the account holder's transaction request provided via external network connection hub (600), classifies and assigns a separate code (bank account type, etc.) to the primary account (1500) as well as to linked secondary accounts (1600), (1700), (1800); save and manage names of linked secondary accounts specified by the primary account holder together with the account number; assign predetermined account classification code linked accounts' names, and save and manage; when predetermined merchants request transaction on other account holder's card wherein the account is with merchant specific account, possess connecting function for transaction on the respective account by comparing information on above merchant with account classification code.

Such linked account translator (1400) function could be a separately constructed computer system aside from the main computer system (700), and when linked accounts' data volume is minimal may as well feature the function of linked secondary account translator (1400) as software. Furthermore, the linked secondary accounts (1600), (1700), (1800) in FIG. 28, may be regard as a type of account wherein only the account number differing from the account database (800) at main computer system (700), the case has not been illustrated in the Figure, can manage the account database (800) with the primary account (1500), linked secondary account A (1600), linked secondary account B (1700), and linked secondary account C (1800).

Furthermore, a common account (1900) is connected to the main computer system (700), wherein the common account (1900) acting as a temporary account accessed to save while processing, meaning the account created by the main computer system (700) for transaction via above external network connection hub (600), account transaction of account database (800), linked account translator (1400) and linked accounts (1600), (1700), (1800), and/or inter-account transaction (or transaction within accounts) via payment gateway (900).

In this common account, main computer system (700) may save the transaction details in batch process, transaction details transferred by the main computer system (700) from the saved common account (1900) to another merchant account respectively, and the actual structure can have construction identical to that of any other bank accounts.

Figure 29:
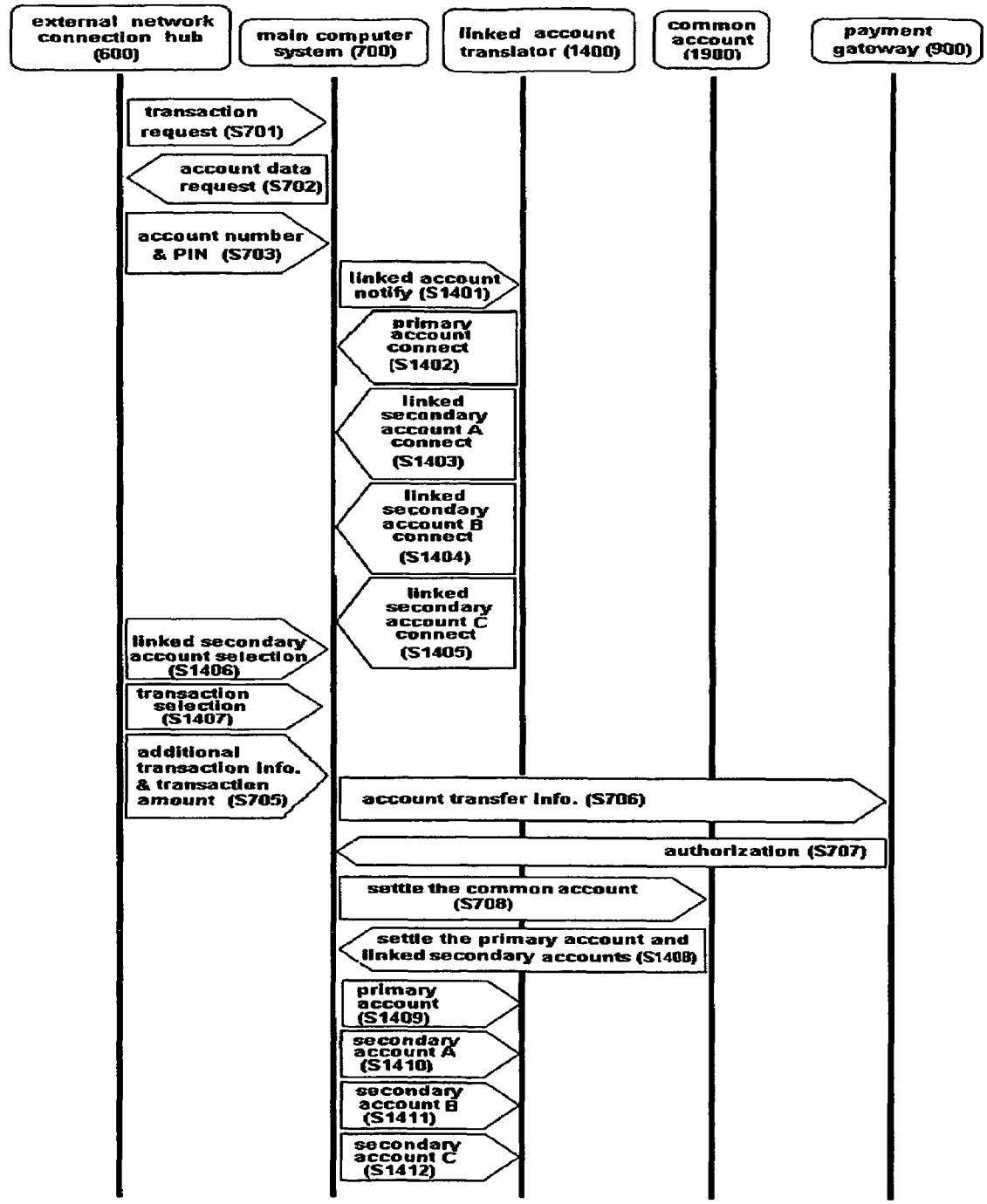
FIG. 29: Flow of transaction via external network connection hub

FIG. 29 illustrates, as represented by FIG. 18 on the construction of the invention previously described, the data flow on creation of transaction data by DTMF measures, etc., at the terminal (100) connected via internet server (200) and wire & wireless telephone (300), and on transmission of transaction data from ARS server (400), ATM terminal (500), and counter terminals, etc., to main computer system (700) via external network connection hub (600).

When a transaction request (S701) is created from the terminal (100) connected via internet server (200), wire-& wireless telephone (300) via ARS server (400), the ATM terminal (500), etc., the main computer system (700) which received the request in return sends account data request (S702) to the equipment which the respective transaction request is created and transferred. From the equipment which requested for transaction, account data such as account number and PIN(S703) is sent to the main computer system (700).

Then, main computer system decides if the account is a linked account by the previously described account number classification, then notifies (S1401) to linked account translator (1400). The linked account translator (1400) connects (S1402), (S1403), (S1404), (S1405) corresponding primary account as well as linked accounts to the main computer system (700) respectively at the request of main computer system (700)'s request; with reference to it, the main computer system (700) selects linked account based on the data from the external network connection hub (600), upon receiving selected transaction (S1407), transaction information, as well as transaction amount (S705) from the main computer system (700), make settlements (S708) in the common account with the information on transaction summary as well as transaction amount (S705) with reference to above transaction detail.

The main computer system (700) make settlements (S1408) on the primary account as well as linked account(s) by information on transaction summery and amount from the common account (1900), then the transactions (S1409)~ (S1412) for each account actually takes place. If the result of transaction information happens to require transaction to bank other than the account opened bank such as the transfer to the account at bank other than account opened bank, the main computer system (700) transmits account transfer information (S706) to payment gateway (900) for approval of the respective bank, be authorized, then make settlements (S708) in the common account together with the transaction information and amount, etc., with reference to the said transaction details. Then, the main computer system (700) make settlements (S1408) on primary account as well as the linked account based on information on the transaction statement and amount from the common account (1900), and transaction (S1409)~(S1412) for each account actually takes place.

Figure 30:
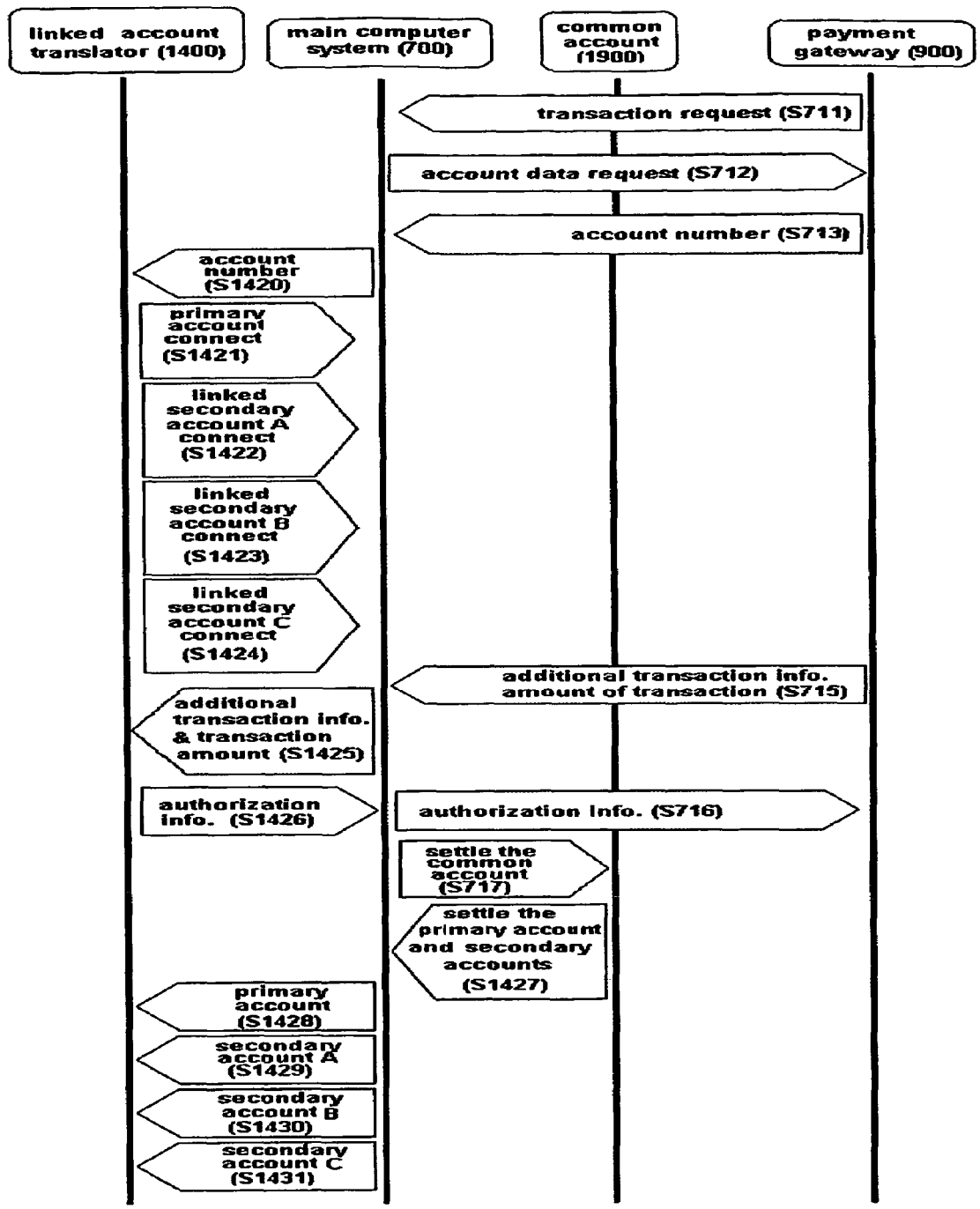
FIG. 30: Flow of transaction via payment gateway

FIG. 30, as represented by FIG. 18 on the construction of the invention previously described, illustrates the flow of transaction via payment gateway (900). When a transaction request (S711) is created by other bank's computer system (1000), (1200), card transaction terminal connected via VAN, and by the other authorized financial trade institute, the main computer system (700) send account data request (S712) via payment gateway (900) to the computer system or terminal which created the respective transaction request. The equipment that requested transaction sends account data such as account number (S713) via payment gateway (900) to the main computer system (700), and the main computer system (700) in return by recognizing the account as a linked account by previously described account number classification, transmits (S1420) account number to the linked secondary account translator (1400). The linked account translator (1400) connects (S1421), (S1422), (S1423), (S1424) corresponding the primary account as well as linked accounts to the main computer system (700) respectively at the request of main computer system (700).

At the request of the main computer system (700), the linked account translator (1400) connects (S1421), (S1422), (S1423), (S1424) the corresponding primary account as well as linked account to the main computer system. In such case, it is presumed that the account holder has been verified by PIN, etc., at the other bank computer system (1000), (1200), card transaction terminal connected via VAN, and at computer system of the other authorized financial trade institute, does not check for PIN, etc., however, may give additional PIN in case of transactions like withdraw.

From the equipment, then, which requested transaction via payment gateway (900) receives additive transaction information, i.e. transaction equipment's ID number as well as transaction amount (S715), the main computer system (700) transmits (S1425) it to the linked account translator (1400). At this time, the linked account translator (1400) decides by the transaction information from the linked account translator (1400) if the corresponding merchant is a pre-authorized organization, i.e. transaction information is identical to the respective merchant specified account.

To elaborate this with a specific example, the existing transaction information transmitted via payment gateway (900) includes transaction terminal ID number, or the identification code of the merchant where transaction terminal is installed, and therefore in which case the merchant is specified as the merchant in the invention, i.e. is among the linked accounts of account holder's account if it is the merchant specified for transaction, transaction could be made from the designated merchant specified account among the primary account holder's linked secondary accounts. If the primary account holder designated one of the linked accounts to one specific school, transaction could be made accordingly by the transaction terminal number and code and school's identification code from the transaction information transmitted via payment gateway (900). In such case, the linked account translator (1400) transmits yes or no on authorization to the main computer system (700), and the main computer system (700) in return transmits authorization information (S716) to the payment gateway (900), make settlement (S717) in the common account together with the information on the transaction statement and amount, etc., by referring to the transaction details.

The main computer system (700) then make settlements (S1427) in the primary account as well as linked account according to the information on the transaction information and amount, etc., from the common account (1900), followed by the actual transaction (S1428)~(S1431) on each corresponding accounts. During the process, not only based on the balance in account but by adding incidental information such as transaction limit at one time, number of transaction per day, selecting merchants, etc., may allow the transaction bank computer system requests to be processed selectively or limitedly. Likely, this invention's construction, has the advantage to perform the linked account service in this invention without modifying function of the conventional main computer system (700) substantially.

In this invention, describes on linked accounts linked to one primary account, however, according to previously described assignment rules on account number, to one primary account, the primary account holder may appoint the other account holder's account number in plural and manage the linked accounts in group by assigning numbers to each of other account holder's account number to possess linked accounts respectively. This invention described until now, can be realized in various aspects by those with common knowledge in the field of the present invention as needed within the range of the present invention.

The invention claimed is:

1. A method of transacting by linking a primary account and secondary accounts, based on a bank transaction system comprising: a main computer system managing transactions on account holder's accounts including the primary account and the secondary accounts; a database connected to the main computer system and configured to store account holder's account information which is saved and managed by the main computer system; and a payment gateway connected to the main computer system and configured to manage payment between the main computer system and external merchants and/or banks, the method comprising the steps of:

creating a transaction request at a user terminal and sending the created transaction request to the main computer system, and in response the main computer system sends an account data request to the user terminal;

sending account data from the user terminal to the main computer system;

the main computer system classifying the linked primary and secondary accounts based on account classification codes and notifying a linked account translator which is connected to the main computer system and configured to store and manage the primary account and linked secondary accounts;

the linked account translator providing the main computer with information related to the classified primary account and linked secondary accounts;

selecting transaction accounts to be involved in the transaction from the primary account and linked secondary accounts according to data received from the user terminal;

the main computer system receiving transaction information related to a type of transaction and a transaction amount from the user terminal, and storing the transaction information in a common account configured to store the transaction information during the transaction; and the main computer system sending the stored transaction information to the linked account translator to update the primary account and linked secondary accounts based on the transaction information to finish the transaction, wherein the user terminal is selected from a bank computer system, a card transaction terminal connected via a VAN (Value-Added Network), and an authorized financial trade institute computer system via a network, the main computer system sends the account data request to the bank computer system, the card transaction terminal or the authorized financial trade institute computer system via the payment gateway in receipt of the transaction request, the account data including an account number is sent to the main computer system via the payment gateway, the main computer recognizes the account number as a linked account according to the account classification codes and transmits the account number to the linked account translator system, in receipt of the account data, the user terminal transmits a transaction terminal ID to the main computer system and the main computer system sends the transaction terminal ID to the linked account translator, the linked account translator determines whether the transaction terminal ID is associated with one or more accounts of the linked primary and secondary accounts, and causes the transaction to be made on the associated one or more accounts, and the main computer system transmits a determination result to the payment gateway and adjusts the common account based upon the transaction information.

2. The method according to claim 1, further comprising the steps of:

the main computer system transmitting account transfer information through the payment gateway to receive approval on the fund transfer from the banks if the type of transaction requires a fund transfer between the banks; and the main computer system adjusting the primary account and linked secondary accounts respectively based on the transaction information in the common account and the fund transfer.

3. The method according to claim 1, further comprising:

the linked account translator determining whether the transaction terminal ID is associated with one or more accounts of the linked primary and secondary accounts, by comparing the transaction terminal ID and the account classification codes assigned by the banks to the account holder's primary account and linked secondary accounts managed by the linked account translator.

4. The method according to claim 1, wherein the type of transaction on the primary account and linked secondary accounts includes activation of the linked secondary accounts, linking of a new account, providing information on the linked accounts, inquiry on the linked accounts, depositing on the linked accounts, and withdrawal on the linked accounts.

5. The method according to claim 1, wherein the main computer system is further connected with an external network connection hub for relaying transaction data between the main computer system and the user terminal.

6. The method according to claim 5, wherein the user terminal connected to the external network connection hub is selected from a wire or wireless DTMF (Dual Tone Multi Frequency) phone communicating via an ARS (Automated Response System) server, an ATM (Automated Teller Machine) terminal, and an Internet terminal communicating via the Internet.

* * * * *